(12) United States Patent
Berntorp et al.

(10) Patent No.: US 11,327,492 B2
(45) Date of Patent: May 10, 2022

(54) ADAPTIVE CONTROL OF AUTONOMOUS OR SEMI-AUTONOMOUS VEHICLE

(71) Applicant: Mitsubishi Electric Research Laboratories, Inc., Cambridge, MA (US)

(72) Inventors: Karl Berntorp, Cambridge, MA (US); Stefano Di Cairano, Somerville, MA (US); Marcel Menner, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 343 days.

(21) Appl. No.: 16/701,701

(22) Filed: Dec. 3, 2019

(65) Prior Publication Data

US 2021/0165409 A1    Jun. 3, 2021

(51) Int. Cl.
*G05D 1/00*  (2006.01)
*G05D 1/02*  (2020.01)
*G06N 7/00*  (2006.01)
*G07C 5/08*  (2006.01)

(52) U.S. Cl.
CPC ......... *G05D 1/0088* (2013.01); *G05D 1/0221* (2013.01); *G05D 1/0223* (2013.01); *G06N 7/005* (2013.01); *G07C 5/085* (2013.01); *G05D 2201/0213* (2013.01)

(58) Field of Classification Search
CPC .. G05D 1/0088; G05D 1/0221; G05D 1/0223; G06N 7/005; G07C 5/085
USPC .......................................................... 701/27
See application file for complete search history.

(56) References Cited

U.S. PATENT DOCUMENTS

2018/0281785 A1* 10/2018 Berntorp ................ G08G 1/167
2019/0317496 A1* 10/2019 Korchev ............... G05D 1/0088

* cited by examiner

*Primary Examiner* — Isaac G Smith
(74) *Attorney, Agent, or Firm* — Gennadiy Vinokur; Hironori Tsukamoto

(57) ABSTRACT

Controller of a vehicle uses control functions to transition the current state of the vehicle into a target state. A control function is probabilistic to output a parametric probability distribution over the target state defined by a first moment and at least one higher order moment. The controller submits the current state into at least a subset of control functions consistent with the next driving decision to produce a subset of parametric probability distributions over the target state, combines the subset of parametric probability distributions to produce a joint parametric probability distribution of the target state, and determines the control command based on the first moment and at least one higher order moment of the joint parametric probability distribution of the target state.

17 Claims, 36 Drawing Sheets

| | Control Objectives | Probabilistic Control Functions |
|---|---|---|
| 200 | Stay on the road | stay-on-road function |
| 210 | Stay in the middle of the lane | middle-lane function |
| 220 | Maintain nominal speed | maintain-speed function |
| 230 | Maintain safety margin to surrounding obstacles | safety-margin function |
| 240 | Maintain minimum distance to vehicles in the same lane | minimum-headway function |
| 250 | Drive smoothly | smooth-drive function |
| 260 | Increase speed to speed limit | speed-limit function |
| 270 | Change lane | change-lane function |
| 280 | Minimize idling at intersection | intersection-crossing function |

FIG. 2A

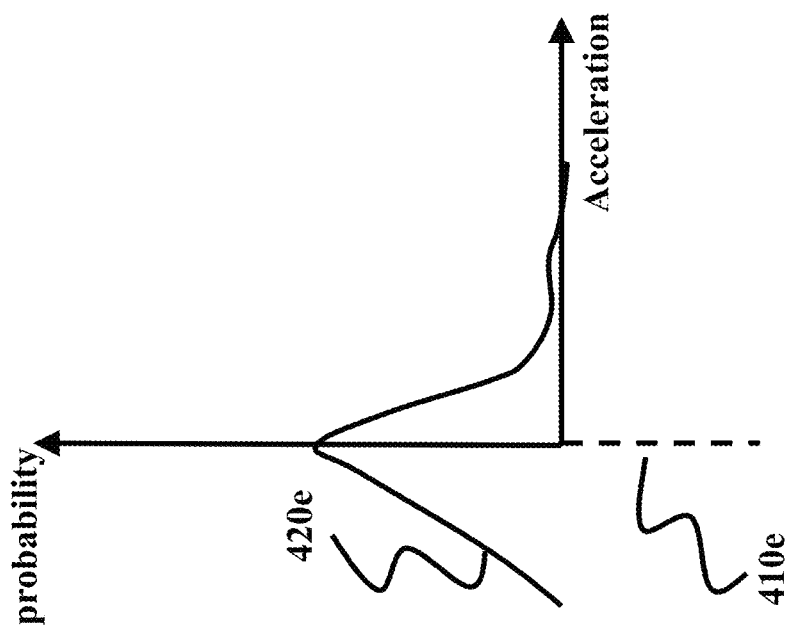

while $c(\xi^t) - \nabla_\xi c(\xi^t)) - c(\xi^t) > -\frac{l}{2}|\nabla_\xi c(\xi^t)|^2$
$l \leftarrow \gamma l$     $\triangle \gamma = 0.7$ in our case
end while

FIG. 4I

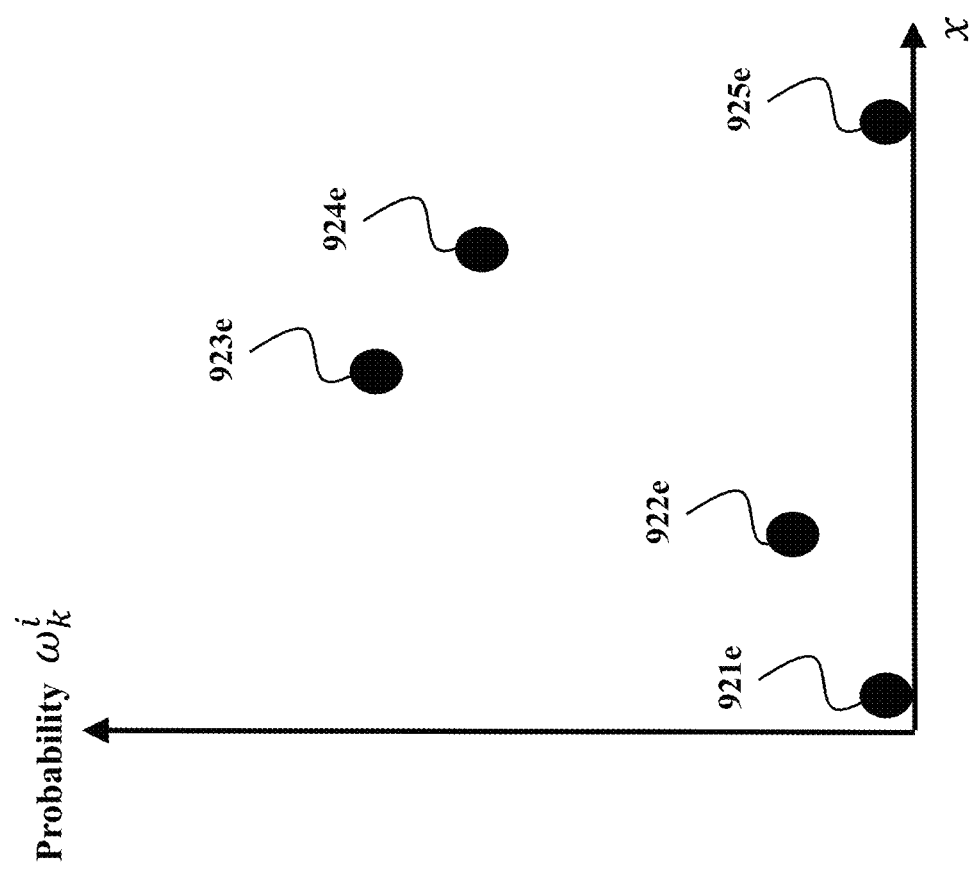

ADAPTIVE CONTROL OF AUTONOMOUS OR SEMI-AUTONOMOUS VEHICLE

TECHNICAL FIELD

The present invention relates generally to controlling vehicles, and more particularly to controlling an autonomous or a semi-autonomous vehicle.

BACKGROUND

Autonomous vehicles are complex decision-making systems that require the integration of advanced and interconnected sensing and control components. At the highest level, a sequence of driving decisions is computed through the road network by a route planner. A discrete decision-making layer is responsible for determining the local driving goal of the vehicle. Each decision could be any of turn right, stay in lane, turn left, or come to full stop in a particular lane at an intersection. A sensing and mapping module uses various sensor information, such as radar, LIDAR, camera, and global positioning system (GPS) information, together with prior map information, to estimate the parts of the surroundings relevant to the driving scenario.

The outputs of motion planning are inputs to the vehicle controller. The motion planner is responsible for determining a safe, desirable and dynamically feasible trajectory that the vehicle should follow based on the outputs from the sensing and mapping module. A vehicle control algorithm then aims to track this reference motion, at a relatively high sampling frequency, by issuing commands, e.g., steering angle, wheel torque and brake force. Finally, an actuator control layer regulates the actuators to achieve these requested commands.

The motion-planning problem in autonomous vehicles shares many similarities with the standard robotics setup, and optimal solutions are in most cases intractable due to non-convexity of the problem. Approaches relying on direct dynamic optimization have been developed for specialized scenarios. However, due to non-convexity, this results only in locally optimal solutions, which may be significantly far from the globally optimal one, and possibly at the cost of a relatively large computational load and time. Motion planning is often performed using sampling-based methods such as rapidly-exploring random trees (RRTs), or graph-search methods such as A*, D* and other variations.

Some methods perform the sampling deterministically, while other methods, such as a method described in U.S. Pat. No. 9,568,915, use probabilistic sampling. The sampling techniques are suitable for fast machine calculation, but the path generated by the sampling methods may feel unnatural for passengers in autonomous or semi-autonomous vehicles. Accordingly, there is still a need to improve path planning and control of autonomous or semi-autonomous vehicles.

SUMMARY

Some embodiments are based on recognition that sampling based path planning methods are opportunistic and exploratory in nature. The sampling techniques are suitable for fast machine calculation, but are not necessarily aligned with the way of how a human driver would approach the path planning and/or driving task. As a result, the path generated by the sampling methods may feel unnatural for a passenger of autonomous or semi-autonomous vehicles.

Indeed, a human driver does not decide on a path for a driven vehicle by sampling free space on a way of motion. To that end, it is an object of some embodiments to approximate decision making of a human driver for path generation in a manner suitable for autonomous control of autonomous or semi-autonomous vehicles. Specifically, some embodiments use one or combination of realizations and objectives outlined below.

Firstly, some embodiments are based on recognition that human drivers operate a vehicle not in a sampling opportunistic manner, but in result-oriented manner that aims to reach one or multiple objective of the driving. For example, instead of sampling the space in front of the vehicle, it is in a nature of a human driver to consciously or unconsciously formulate driving objectives for the nearest future. Examples of driving objectives include maintaining the current speed, maintaining headway, increasing speed till speed limit, stopping at the stop sign, maintaining a vehicle in a center of a lane, changing the lanes, avoiding an obstacle, etc. After formulating these objectives, the human drivers use their experience and driving style to navigate the vehicle. To that end, it is an object of some embodiments to provide a driving objective based path planning rather than sampling based one.

Secondly, the human drivers can balance multiple objectives based on their importance and comparability. For example, if one driving objective of maintaining the current speed contradicts another driving objective of maintaining headway, human drivers can balance these objectives to make a safe driving decision. To that end, it is another object of some embodiments, to provide a driving objective based path planning suitable to balance various driving objectives based on their importance for particular driving situation.

Thirdly, human drivers allow flexibility in their decision making. Such flexibility can be based on their driving style, condition of the environment, e.g., state of a traffic or pure visibility increasing uncertainty of the driving or just their mood. To that end, it is an object of some embodiment to incorporate such flexibility in the driving objective based path planning approach.

Fourthly, humans drive their vehicles in different styles. Examples of driving styles include aggressive driving, defensive driving and normal or neutral driving. To that end, it is another object of some embodiments to provide driving objective based path planning adaptable to different driving styles.

Fifthly, the satiations on the road can be unpredictable and rapidly varying. To that end, it is another object of some embodiments to provide driving objective based path planning suitable for control adaptation.

Hence, different embodiments address one or combination of the above-mentioned objectives in a manner suitable for control of autonomous or semi-autonomous vehicles.

Some embodiments are based on understanding that the driving objectives can be represented by control functions transitioning one or multiple state variables from their current values to one or multiple future values in correspondence to the driving objective. Because control functions answer on a "what" question, rather than "how," these control functions mimic result-oriented manner of a human driver. Notably, these control functions are determined in advance to imitate driving experience. In some embodiments, there is one control function per driving objective. Hence, examples of control functions can include functions for maintaining current speed, maintaining headway, increasing speed till speed limit, stopping at the stop sign, maintaining a vehicle in a center of a lane, changing the lanes, avoiding an obstacle, etc.

The input of control function includes state variable of a vehicle, such as one or combination of current speed, acceleration, location, and heading. The input to the control functions can also include a map of the environmental and traffic data. The output of the control functions includes one or combination of target vales of state variable. For example, a control function for maintaining headway can output the target speed of the vehicle. The control function for changing lane can output a sequence of lateral acceleration values.

To that end, some embodiments maintain a set of control functions determined for a set of control objectives to address first realization listed above. Different control functions can be determined in different manner. Some functions are analytical and estimate the target state variables based on a formula. Some functions are solvers and estimate target state variables based on solutions of differential equations. Some functions are learners and estimate target state variables according to hyperparameters previously learned from training data. The hyperparameters allow mapping the control function to actual driving data.

Some embodiments are based on realization that the control functions should be probabilistic, i.e., output a probabilistic distribution of target state variables. For example, a control function for maintaining a current speed should output not just speed or acceleration values but probabilistic distribution of these values. The probabilistic distribution can be parameterized by their parameters, such as means and variance in case of Gaussian distribution. To that end, in some embodiments, the control functions include deterministic component mapping current state variable to the target state variables and a probabilistic component defining a distribution for each of the target state variables. In effect, the probabilistic nature of the control function mimics flexibility in driving decision making allowing to adapt driving objective based path planning to unpredictability of control environment.

Next, some embodiments are based on realization that probabilistic components of the control function can encode importance of the function in generating path that balances multiple control objectives. For example, in some embodiments, the importance of the control objective is inversely proportional to a variance of the probabilistic component of the control function. Some embodiments use this relationship for combining outputs of multiple control functions to estimate the target states for a path of a vehicle.

Next, some embodiments are based on realization that probabilistic components of the control function can encode driving style of the passengers. For example, the deterministic component of the control function can be determined for a normal driving style, while the probabilistic component of the control function can represent deviation from the normal style. For example, the control function can be associated with multiple probabilistic components mapped to different driving styles. For example, for a lane changing driving objective, the probabilistic component of the control function outputs a path resembling a sigmoid function. The probabilistic component corresponding to the aggressive driving style shape the distribution covering the sigmoid function to increase likelihood of using sharper turns than prescribed by the curvatures of the sigmoid function. To that end, some embodiments include a set of probabilistic components for at least some control function in the set to allow a selection of the probabilistic component to reflect the driving style.

Additionally, or alternatively, some embodiments use a distribution aware controller that controls the vehicle according to the path represented by the probability distribution of the target state variables. Specifically, some embodiments use an integrated architecture for (semi-) autonomous driving systems that involves a low-rate, long-term sampling-based motion planning algorithm and a high-rate, highly reactive optimization-based predictive vehicle controller. This integration enables a systematic and effective sharing in the burden of achieving multiple competing objectives by the motion planning and vehicle control layers, e.g., ensuring both the satisfaction of safety requirements, as well as ensuring a reliable and comfortable driving behavior in relatively complex highway and urban driving scenarios. This integration adapts flexibility of the control with the uncertainty of path generation.

In addition, the controller determines the control commands to the actuators of the vehicles in consideration of the first moment and higher order moments of the probabilistic distribution of the target state variables. For example, in one embodiment the controller is a predictive controller configured to determine the control command by optimizing a cost function over a prediction horizon to produce a sequence of control commands to one or multiple actuators of the vehicle. The optimization of the cost function balances a cost of tracking the sequence of the target states defined by the first moments of the joint parametric probability distributions against a cost of at least one other metric of the motion of the vehicle. The importance of the tracking cost is weighted using one or multiple of the higher order moments of the joint probability distribution in the balancing optimization.

Accordingly, one embodiment discloses a system for controlling a motion of a vehicle. The system includes an input interface configured to accept a current state of the vehicle, an image of an environment in proximity to the vehicle, and a next driving decision of the vehicle; a memory configured to store a set of control functions, wherein each control function is configured to transition the current state of the vehicle into a target state based on its corresponding control objective, wherein at least some of the control functions are probabilistic and include a deterministic component for transitioning the current state into the target state and a probabilistic component for determining a probabilistic distribution of values around the target state determined by the deterministic component, such that an output of the probabilistic control function is a parametric probability distribution over the target state defined by a first moment and at least one higher order moment; a processor configured to execute a motion planner and a controller, wherein upon the execution, the motion planner submits the current state into at least a subset of control functions consistent with the next driving decision to produce a subset of parametric probability distributions over the target state; and combines the subset of parametric probability distributions to produce a joint parametric probability distribution of the target state, wherein upon the execution, the controller determines the control command based on the first moment and at least one higher order moment of the joint parametric probability distribution of the target state; and an output interface configured to output the control command to an actuator of the vehicle.

Another embodiment discloses a method for controlling a motion of a vehicle. The method uses a processor coupled to a memory storing a set of control functions, wherein each control function is configured to transition the current state of the vehicle into a target state based on its corresponding control objective, wherein at least some of the control functions are probabilistic and include a deterministic component for transitioning the current state into the target state and a probabilistic component for determining a probabilistic distribution of values around the target state determined by the deterministic component, such that an output of the probabilistic control function is a parametric probability distribution over the target state defined by a first moment and at least one higher order moment. The processor is coupled with stored instructions implementing the method, wherein the instructions, when executed by the processor carry out at least some steps of the method, that includes accepting a current state of the vehicle, an image of an environment in proximity to the vehicle, and a next driving decision of the vehicle; submitting the current state into at least a subset of control functions consistent with the next driving decision to produce a subset of parametric probability distributions over the target state; combining the subset of parametric probability distributions to produce a joint parametric probability distribution of the target state; determining the control command based on the first moment and at least one higher order moment of the joint parametric probability distribution of the target state; and outputting the control command to an actuator of the vehicle.

Yet another embodiment discloses a non-transitory computer readable storage medium embodied thereon a program executable by a processor for performing a method, the medium stores a set of control functions, wherein each control function is configured to transition the current state of the vehicle into a target state based on its corresponding control objective, wherein at least some of the control functions are probabilistic and include a deterministic component for transitioning the current state into the target state and a probabilistic component for determining a probabilistic distribution of values around the target state determined by the deterministic component, such that an output of the probabilistic control function is a parametric probability distribution over the target state defined by a first moment and at least one higher order moment. The method includes accepting a current state of the vehicle, an image of an environment in proximity to the vehicle, and a next driving decision of the vehicle; submitting the current state into at least a subset of control functions consistent with the next driving decision to produce a subset of parametric probability distributions over the target state; combining the subset of parametric probability distributions to produce a joint parametric probability distribution of the target state; determining the control command based on the first moment and at least one higher order moment of the joint parametric probability distribution of the target state; and outputting the control command to an actuator of the vehicle.

BRIEF DESCRIPTION OF THE DRAWINGS

FIG. 2A illustrates an exemplar list of possible control objectives of the driving behavior for driving on roads and their corresponding control functions according to some embodiments.

FIG. 4E shows an illustration of a possible way to describe a control function of the driving objective of driving smoothly according to one embodiment.

FIG. 4I shows a method for determining a step length according to one embodiment.

FIG. 9E shows possible assigned probabilities of the five states at the first iteration in FIG. 9D.

DETAILED DESCRIPTION

Figure 1A:
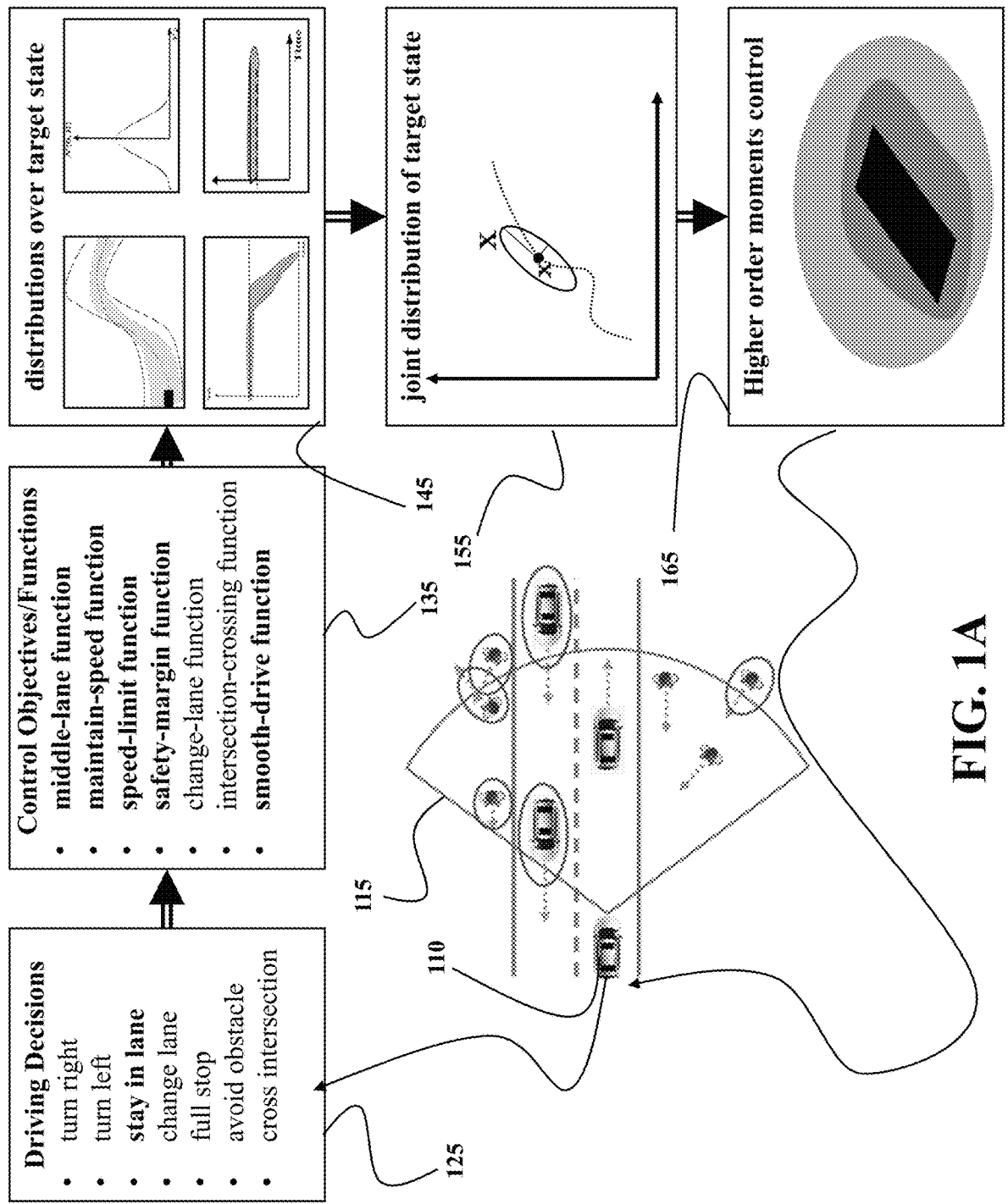
FIGS. 1A and 1B show schematics of a result-oriented driven control of a vehicle according to some embodiments.
Figure 1B:
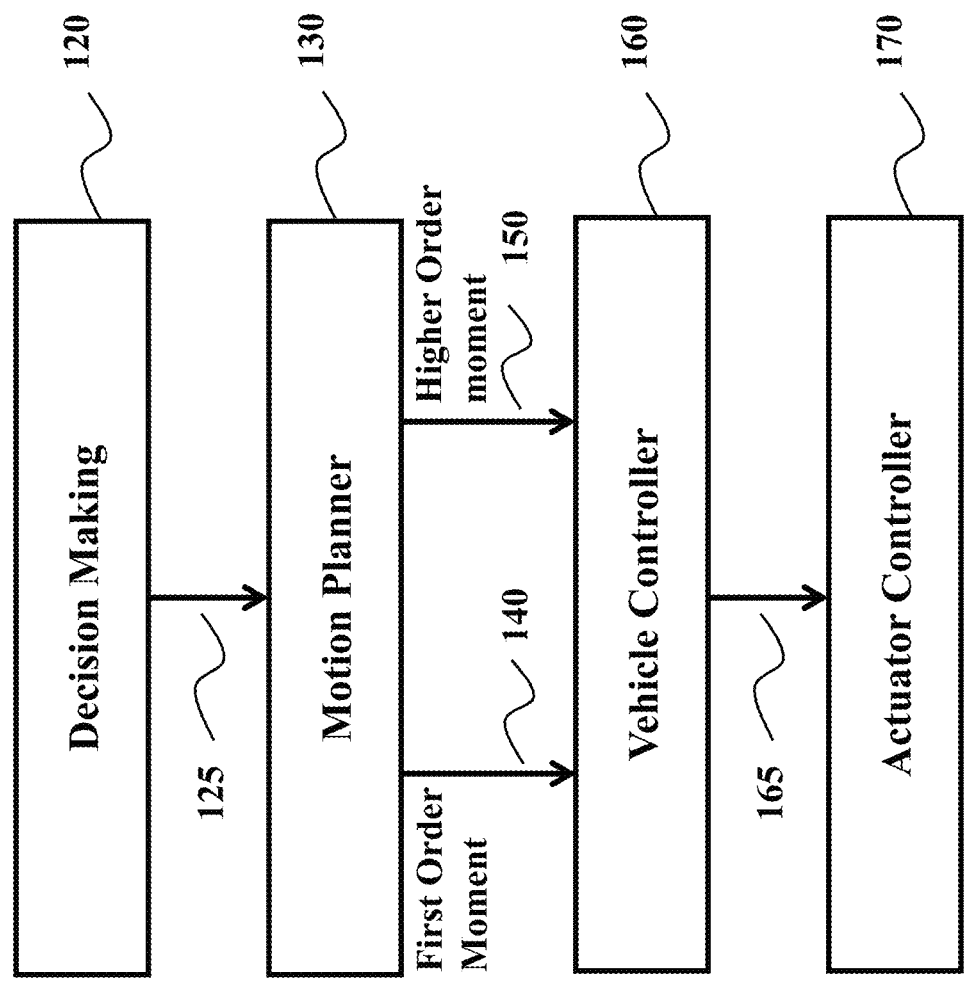

FIGS. 1A and 1B show schematics of a result-oriented driven control of a vehicle according to some embodiments. Some embodiments are based on recognition that sampling based path planning methods are opportunistic and exploratory in nature. The sampling techniques are suitable for fast machine calculation, but are not necessarily aligned with the way of how a human driver would approach the path planning and/or driving task.

Some embodiments are based on recognition that human drivers operate a vehicle not in a sampling opportunistic manner, but in result-oriented manner that aims to reach one or multiple objective of the driving. For example, instead of sampling the space in front of the vehicle, it is in a nature of a human driver to consciously or unconsciously formulate driving objectives for the nearest future. Examples of driving objectives/decisions include maintaining the current speed, maintaining headway, increasing speed till speed limit, stopping at the stop sign, maintaining a vehicle in a center of a lane, changing the lanes, avoiding an obstacle, etc. After formulating these objectives, the human drivers use their experience and driving style to navigate the vehicle. To that end, it is an object of some embodiments to provide an objective based path planning rather than sampling based one. To that end, some embodiments employ a decision-making module 120 configured to formulate one or multiple driving decisions 125 for the controlled vehicle 110 based on the current state of the vehicle in the environment 115.

In addition, human drivers can balance multiple objectives based on their importance and comparability. To that end, some embodiments maintain in a memory a list of control functions 135 corresponding to one or multiple control objectives. Each control function maps the current state of the vehicle 110 to its future target state based on their corresponding objectives of control. The state of the vehicle can include multiple state variables, such as position, velocity and heading of the vehicle. Different set of state variables are possible, and some state variables can be mapped to another state variable.

Some embodiments are based on understanding that the driving objectives can be represented by control functions transitioning one or multiple state variables from their current values to one or multiple future values in correspondence to the driving objective. Because control functions answer on a "what" question, rather than "how," these control functions mimic result-oriented manner of a human driver. Notably, these control functions are determined in advance to imitate driving experience. In some embodiments, there is one control function per driving objective. Hence, examples of control functions can include functions for maintaining current speed, maintaining headway, increasing speed till speed limit, stopping at the stop sign, maintaining a vehicle in a center of a lane, changing the lanes, avoiding an obstacle, etc.

The input to control function includes at least one state variable of a vehicle, such as one or combination of current speed, acceleration, location, and heading. The input to the control functions can also include a map of the environmental and traffic data. The map and the traffic data can form an image of the environment 115. The output of the control functions includes one or combination of target vales of state variable. For example, a control function for maintaining headway can output the target speed of the vehicle. The control function for changing lane can output a sequence of lateral acceleration values.

Having the control function determined in advance, allows a motion planner 130 to use control functions consistent with the driving decision to evaluate jointly the future target state. For example, if the driving decision is to stay in a lane, maintaining safety margin from the obstacles on a road and maintain position of the vehicle in in a middle of the lane are objectives consistent with the driving decision, while changing lane objective is not.

Additionally, or alternatively, human drivers allow flexibility in their decision making. Such flexibility can be based on their driving style, condition of the environment, e.g., state of a traffic or pure visibility increasing uncertainty of the driving or just their mood. To that end, it is an object of some embodiment to incorporate such flexibility in the driving objectives path planning approach. In addition, humans drive their vehicles in different styles. Examples of driving styles include aggressive driving, defensive driving and normal or neutral driving. To that end, it is another object of some embodiments to provide driving objective based path planning adaptable to different driving styles.

To allow for these flexibilities, in some embodiments the control functions 135 are probabilistic, i.e., output a probabilistic distribution of target state variables 145. For example, a control function for maintaining a current speed outputs not just speed or acceleration values but probabilistic distribution of these values. The probabilistic distribution can be parameterized by their parameters, such as means and variance in case of Gaussian distribution. To that end, in some embodiments, the control functions include deterministic component mapping current state variable to the target state variables and a probabilistic component defining a distribution for each of the target state variables. In effect, the probabilistic nature of the control function mimics flexibility in driving decision making allowing to adapt driving objective based path planning to unpredictability of control environment.

Notably, different control function can determine probabilistic distribution for the same or different state variables. Hence, some embodiments combine probabilistic distributions 145 into a joint distribution 155 of one or multiple state variables of the target state, referred herein as a joint parametric probability distribution of the target state, because such a joint parametric distribution is defined by parameters of a first moment 140 and at least one higher order moment 150, such as second, third, and/or forth moments.

Estimating target state via joint parametric probability distribution with higher moments, allow some embodiments to use a distribution aware controller 160 that controls 165 the vehicle according to the path represented by the probability distribution of the target state variables. For example, some embodiments use an integrated architecture for (semi-) autonomous driving systems that involves a low-rate motion planning 130 and a high-rate, highly reactive vehicle controller 160 that determines the control command 165 for actuators 170 based on the first moment and at least one higher order moment of the joint parametric probability distribution of the target state. This integration enables a systematic and effective sharing in the burden of achieving multiple competing objectives by the motion planning and vehicle control layers, e.g., ensuring both the satisfaction of safety requirements, as well as ensuring a reliable and comfortable driving behavior in relatively complex highway and urban driving scenarios. This integration adapts flexibility of the control with the uncertainty of path generation.

FIG. 2A shows an exemplar list of possible control objectives of the driving behavior for driving on roads and their corresponding control functions according to some embodiments. After formulating these objectives, the human drivers use their experience and driving style to navigate the vehicle. Some embodiments, however, design control functions for corresponding driving objectives. The control functions transition the current state of the vehicle to target state of the vehicle in accordance with corresponding objective. The control functions can be designed analytically and/or learned from data.

For example, one driving objective is to mandate the vehicle to stay on the road 200 and its corresponding a stay-on-road function is configured to maintain a position of the vehicle within boarders of a road. Possible additional driving objectives can mandate that the vehicle should drive in the middle of the lane 210 with a nominal velocity 220. Their corresponding control functions can include a middle-lane function configured to maintain the position of the vehicle in a middle of a lane and/or a maintain-speed function configured to maintain a current speed of the vehicle.

In another example, the driving objectives can also mandate the vehicle to maintain safety margin 230 to surrounding obstacles using its corresponding safety-margin function configured to maintain a minimum distance between the vehicle and an obstacle on the road. In addition, another possible driving objective typical for human drivers is to maintain safety distance to vehicles in the same lane 240. This can be achieved with corresponding minimum-headway function configured to maintain a minimum headway between the vehicle and a leading vehicle. For reasons of passenger comfort, fuel consumption, wear-and-tear, or other reasons, some drivers want to mandate a smooth drive 250 of the vehicle. Some embodiments achieve that by using a smooth-drive function configured to maintain smoothness of the motion of the vehicle.

Other examples of driving objectives include increasing speed to speed limit 260 using a speed-limit function configured to maintain a speed of the vehicle at a speed limit, changing lane 270 using a change-lane function configured to change a current position of the vehicle from a current lane to a neighboring lane, and minimize idling at intersection 280 to reduce fuel consumption by using an intersection-crossing function configured to reduce an idle time of the vehicle at an intersection.

Typically, human drivers may have counteracting driving objectives. For example, it can be impossible to maintain constant velocity 220 while keeping a safety margin 230 to surrounding obstacles, or the driving objective 210 only states that the vehicle should maintain the middle of one of several lanes. Some embodiments balance the counteracting driving objectives by making at least some control function probabilistic.

Specifically, some embodiments are based on the realization that driving objectives for a driver cannot be fulfilled exactly. For example, the objective of speeding up to the speed limit 260 may sometimes be incompatible with the driving objective of maintaining the safety margin to surrounding obstacles 230. Also, a driver may from time to time decide a little bit differently what driving objectives are of most importance. Furthermore, for the case of a self-driving vehicle, there are additional uncertainties causing the driving objectives to be impossible to fulfill exactly. Hence, there is both an inexactness in achieving the driving objective, and the fulfillment degree of such driving objectives can vary from time to time.

Figure 2B:
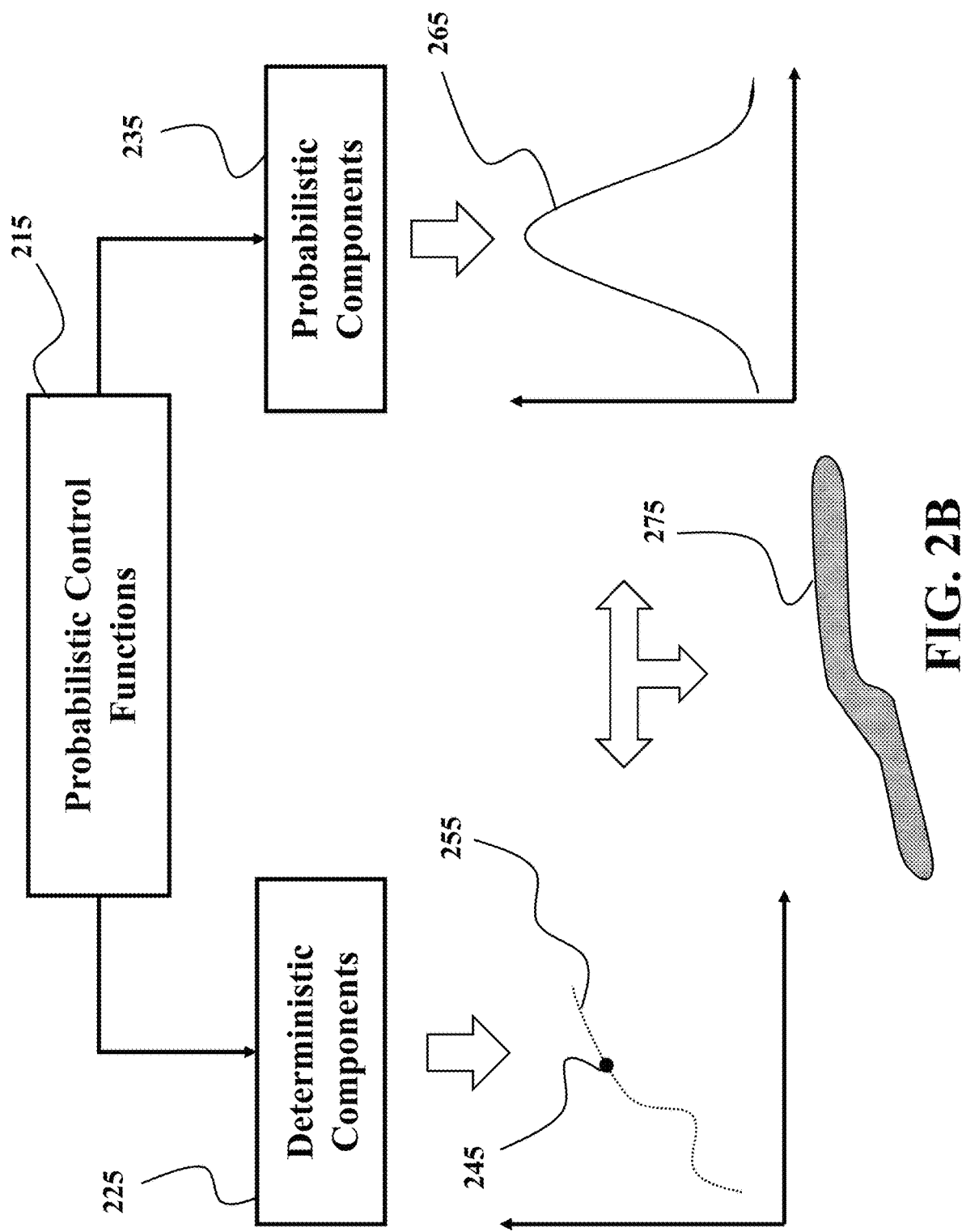
FIG. 2B shows a schematic of a structure of a probabilistic control function employed by some embodiments.

FIG. 2B shows a schematic of a structure of a probabilistic control function 215 employed by some embodiments. Each control function 215 is configured to transition the current state of the vehicle into a target state in a probabilistic manner based on its corresponding control objective. To that end, a probabilistic control function 215 includes a deterministic component 225 for transitioning the current state into the target state 255 and a probabilistic component 235 for determining a probabilistic distribution 265 of values around the target state determined by the deterministic component. The deterministic component can produce a single value 245 of the target state or a sequence of multiple values 255. Additionally, or alternatively, the deterministic component can be executed multiple times to produce the sequence 255. However, in some implementations, for each value 245 of the sequence of target states there is a probabilistic distribution 265, such that an output of the probabilistic control function is a parametric probability distribution 275 over the target state defined by a first moment and at least one higher order moment.

For example, one embodiment uses a set of control functions, which includes one combination of a stay-on-road function having the control objective to maintain a position of the vehicle within boarders of a road, wherein the stay-on-road function includes the deterministic component that outputs a sequence of target headings of the vehicle based on a current heading of the vehicle and a distance of the vehicle to a boarder of the road, wherein the stay-on-road function includes the probabilistic component providing the probabilistic distribution of values around each target heading in the sequence of the target headings determined by the deterministic component of the stay-on-road function; a middle-lane function having the control objective to maintain the position of the vehicle in a middle of a lane, wherein the middle-lane function includes the deterministic component that outputs a sequence of target headings of the vehicle based on a current heading of the vehicle and a lateral displacement of a current position of the vehicle from the middle of the lane, such that tracking of the sequence target headings reduces the lateral displacement, wherein the middle-lane function includes the probabilistic component providing the probabilistic distribution of values around each target heading in the sequence of the target headings determined by the deterministic component of the middle-lane function; a maintain-speed function having the control objective to maintain a current speed of the vehicle, wherein the maintain-speed function includes the deterministic component that outputs a target velocity based on a current velocity of the vehicle, such that the target velocity equals the current velocity, wherein the maintain-speed function includes the probabilistic component providing the probabilistic distribution of values around the target velocity determined by the deterministic component of the maintain-speed function; a speed-limit function having the control objective to maintain a speed of the vehicle at a speed limit, wherein the speed-limit function includes the deterministic component that outputs a sequence of target velocities of the vehicle reaching the speed limit from the current velocity, wherein the speed-limit function includes the probabilistic component providing the probabilistic distribution of values around each target velocity in the sequence of target velocities determined by the deterministic component of the speed-limit function; a safety-margin function having the control objective to maintain a minimum distance between the vehicle and an obstacle on the road, wherein the safety-margin function includes the deterministic component that outputs a sequence of target positions of the vehicle maintaining at least the minimum distance to the position of the obstacle, wherein the safety-margin function includes the probabilistic component providing the distribution of values of the target positions around all instances of the sequence of target positions determined by the deterministic component of the safety-margin function; a minimum-headway function having the control objective to maintain a minimum headway between the vehicle and a leading vehicle, wherein the minimum-headway function includes the deterministic component that outputs a sequence of target velocities of the vehicle maintaining the minimum headway, wherein the minimum-headway function includes the probabilistic component providing the distribution of values around each target velocity in the sequence of target velocities determined by the deterministic component of the minimum-headway function; a smooth-drive function having the control objective to maintain smoothness of the motion of the vehicle, wherein the smooth-drive function includes the deterministic component that outputs the target velocity of the vehicle based on the current velocity, such that a difference between the target velocity the current velocity is below a threshold, wherein the smooth-drive function includes the probabilistic component providing the distribution of values around the target velocity determined by the deterministic component of the smooth-drive function; a change-lane function having the control objective to change a current position of the vehicle from a current lane to a neighboring lane, wherein the change-lane function includes the deterministic component that outputs a sequence of target velocities of the vehicle moving the vehicle to a middle of the neighboring lane, wherein the change-lane function includes the probabilistic component providing the distribution of values of the target positions around all instances of the sequence of target velocities determined by the deterministic component of the change-lane function; and an intersection-crossing function having the control objective to reduce an idle time of the vehicle at an intersection, wherein the intersection-crossing function includes the deterministic component that outputs a sequence of target velocities of the vehicle reducing time of crossing the intersection in consideration of obstacles at the intersection and traffic rules governing the crossing, wherein the intersection-crossing function includes the probabilistic component providing the distribution of values of the target positions around all instances of the sequence of target velocities determined by the deterministic component of the intersection-crossing function.

Figure 2C:
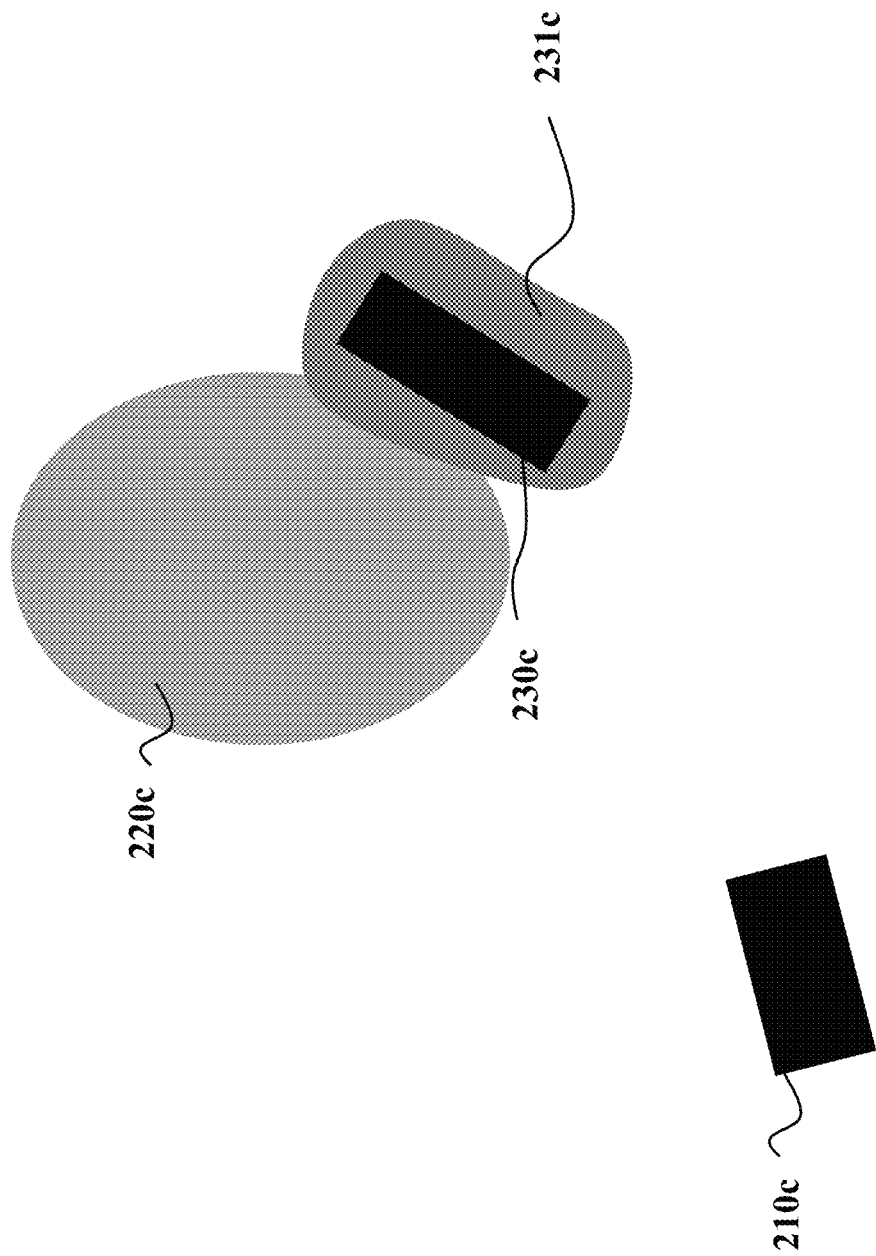
FIGS. 2C and 2D show examples of effect of the probabilistic output of a motion planner on performance of a vehicle controller according to some embodiments.

FIG. 2C shows an example of effect of the probabilistic output of a motion planner on performance of a vehicle controller 160 according to some embodiments. In this example, a current state of a vehicle 210c and a target state 220c that the vehicle tries to reach. The target state 220c can be a Cartesian position, a velocity, or another entity associated with the vehicle. The target state 220c can be a specific state, or a region of states. For example, the target state 220c can be an interval of allowed velocities or a region of possible locations in Cartesian space. A suitable control input is an input that takes the vehicle 210c from its initial state to target state 220c while achieving the driving objectives such as those in FIG. 2A, for example, a driving objective can be to stay within a region 231c on the road. The resulting state 230c from an input can correspond to a state transition resulting in applying a control input for one-time step, or the resulting state 230c can be connected with the initial state 210c with a trajectory 211c, that is, a sequence of state transitions.

The transition from the current state to the target state can be performed by testing a control input for a model of the motion of the vehicle in case of an autonomous vehicle. The model of the motion transitions the states of the vehicle according to a control input submitted to the model. In various embodiments, the model of the motion of the vehicle includes an uncertainty. To that end, the model of the motion of the vehicle is a probabilistic motion model, in order to account for that the model is a simplified description of the actual motion of the vehicle, but also to account for uncertainty in sensing of the true state of the vehicle, uncertainty in sensing of the state of obstacles, and uncertainty in sensing of the environment.

FIG. 2C shows the target state region 231c resulting from a particular choice of control input, i.e., driving behavior for a manual operator, wherein 231c is a nonzero probabilistic component and 230c is the deterministic component included in the region 220c. The driving objective region 220c is not overlapping with the target state region 231, i.e., the region 231c does not include the driving objective region 220c. Hence, referring to FIG. 2C, the driving objective 220c is likely to not be fulfilled and controller can alter its operations.

Figure 2D:
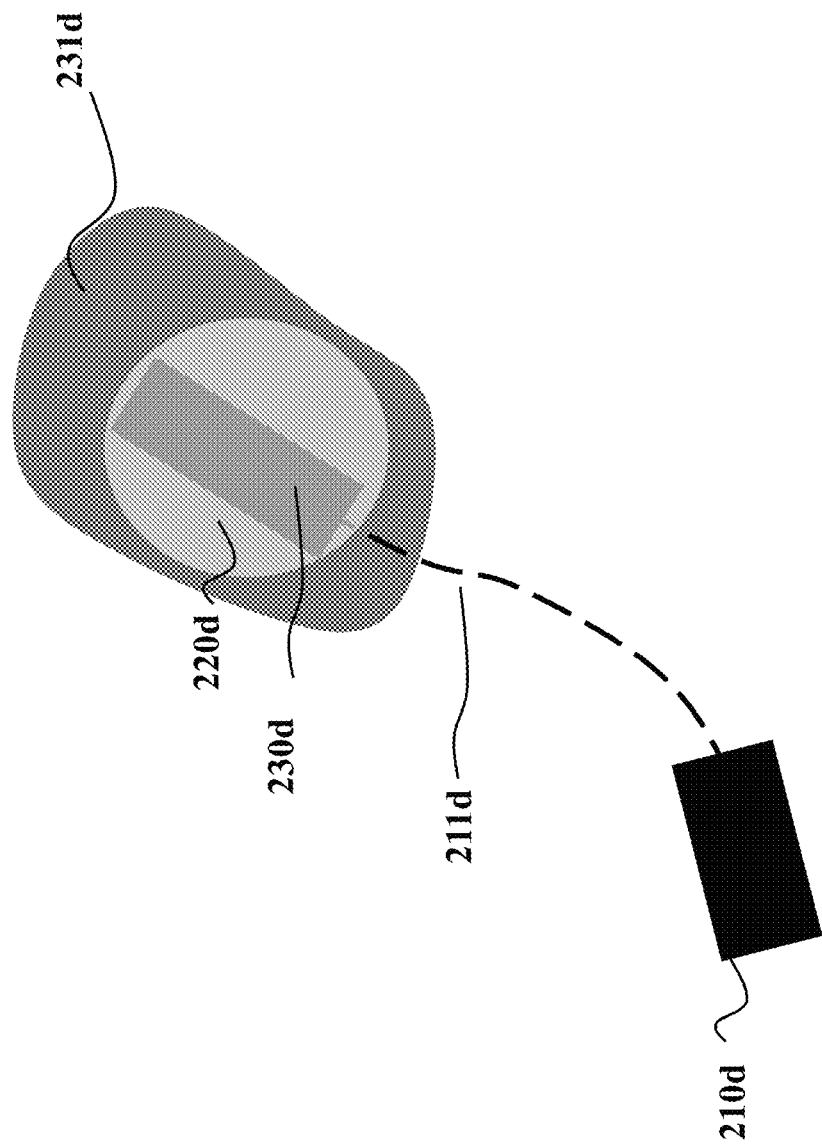

FIG. 2D shows the target state region 231d resulting from a particular choice of control input, i.e., driving behavior for a manual operator, wherein 231d is a nonzero probabilistic component and 230d is the deterministic component included in the region 231d. The driving objective region 220d is smaller than the target state region 231d and is entirely contained in 231d, i.e., the region 231d includes the region 220d. Hence, referring to FIG. 2D, the driving objective 220d is likely to be fulfilled by the choice of control inputs.

Figure 3A:
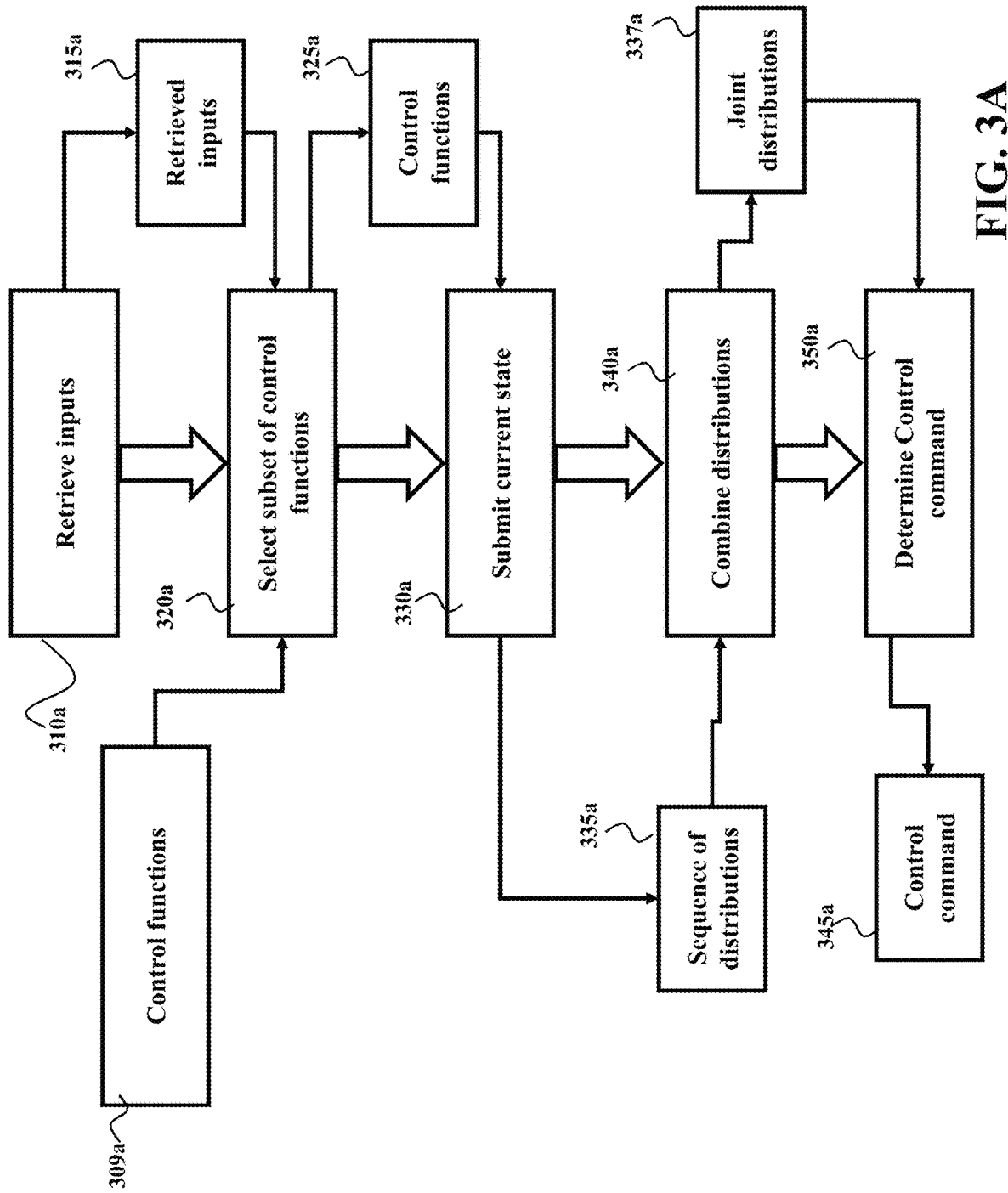
FIG. 3A shows a flowchart of a method for controlling a vehicle according to one embodiment of the invention.

FIG. 3A shows a flowchart of a method for controlling a vehicle according to one embodiment of the invention. The method can be implemented using a processor of the vehicle. The method admits 310a from an input interface a current state of the vehicle, an image of the environment in proximity to the current state of the vehicle, and a next driving decision of the vehicle; retrieves from a memory a set of control functions 309a, wherein at least some of the control functions are probabilistic and include a deterministic component for transitioning the current state into the target state and a probabilistic component for determining a probabilistic distribution of values around the target state determined by the deterministic component, such that an output of the probabilistic control function is a parametric probability distribution over the target state defining a first moment and at least one higher order moment of the probability distribution.

Then, the method selects 320a at least a subset of the control functions 309a to produce a subset of control functions 325a based on the current state, the environment, and the next driving decision of the vehicle. Then, using the subset of control functions, the method submits 330a the current state into the selected control functions 325a to produce a sequence of subsets of parametric probability distributions 335a over a sequence of states defining a motion plan for the vehicle reaching the target state. Then, the method combines 340a the sequence of parametric probability distributions in the subset to produce a joint parametric probability distribution 337a of the target state. Finally, the controller determines 350a the control command 345a based on the first moment and at least one higher order moment of the joint parametric probability distribution of the target state.

Figure 3B:
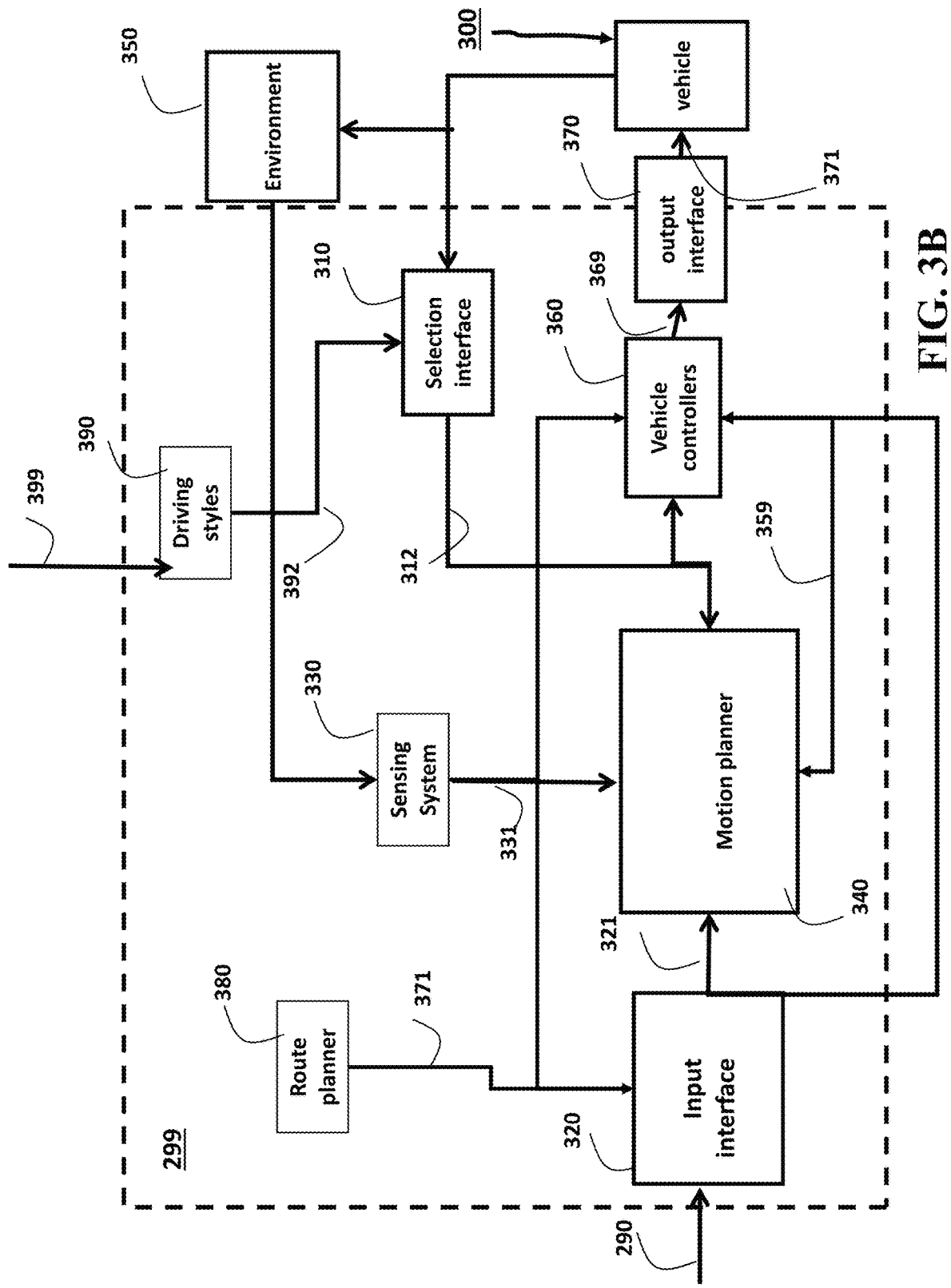
FIG. 3B illustrates a general block diagram of a control system for controlling a vehicle moving on a road and interacting with the environment.

FIG. 3B illustrates a general block diagram of a control system 299 for controlling a vehicle 300 moving on a road and interacting with the environment 350 according to some embodiments. Different component of the control system 299 can be implemented using one or several processors operatively connected to a memory and/or various types of sensors of the vehicle. As used herein, a vehicle can mean any wheeled vehicle, including a passenger car, a bus. The vehicle can be an autonomous vehicle or a semi-autonomous vehicle. The control system 299 can be internal to the vehicle 300 and the implementation of the different components of the control system 299 can depend on the type of the vehicle. For example, depending on the type of the vehicle, the controllers 360 that generate the control commands to actuators of the vehicle 300 can vary. The control system 299 can include a sensing system 330 that measures inertial components of the vehicle, such as rotation rate of the vehicle and acceleration of the vehicle, using an inertial measurement unit (IMU). For example, the IMU can comprise 3-axis accelerometer(s), 3-axis gyroscope(s), and/or magnetometer(s). The IMU can provide velocity, orientation, and/or other position related information to other components of the control system 299. The sensing system 330 can also receive global position information from a global positioning system (GPS) or equivalent, or it can contain camera, radar, and/or lidar sensors to extract information about the environment.

The control system also includes an input interface 320 configured to accept a current state of the vehicle 290, an image 290 of a environment in proximity to the current state of the vehicle, and a next driving decision 290 of the vehicle. The input interface 320 accepts the information 290 and transmits it 321 to a motion planner 340. The motion planner 340 uses the transmitted information 321 and data 331 from a sensing system 330, to produce a sequence of subsets of parametric probability distributions over a sequence of states defining a motion plan for the vehicle reaching the target state.

The input interface can accept information about the environment either from a source external 290 to the vehicle, or it can accept information 331 from a sensing system 330 located inside the vehicle. Similarly, the input interface 320 can accept information about the next target state either from an external source, or info ration 371 from a route planner 380 or similar system.

The control system 299 also includes at least one vehicle controller 360 configured to determine a control command 369 based on the first moment and at least one higher order moment of the joint parametric probability distribution of the target state. The control command 369 is transmitted to an output interface 370 configured to output 371 the control command to an actuator of the vehicle.

The control system 299 also includes a selection interface 310 allowing an occupant of the vehicle 300 to select a driving style, wherein the processor associates probabilistic components of the probabilistic control function corresponding to the selected driving style. The set of driving styles 392 the occupant of the vehicle can select between using the selection interface 310, is stored in a memory containing different driving styles, wherein the stored driving styles 390 are learned using data collected either in real time from a driver of the vehicle or by a remote connection 399.

Figure 3C:
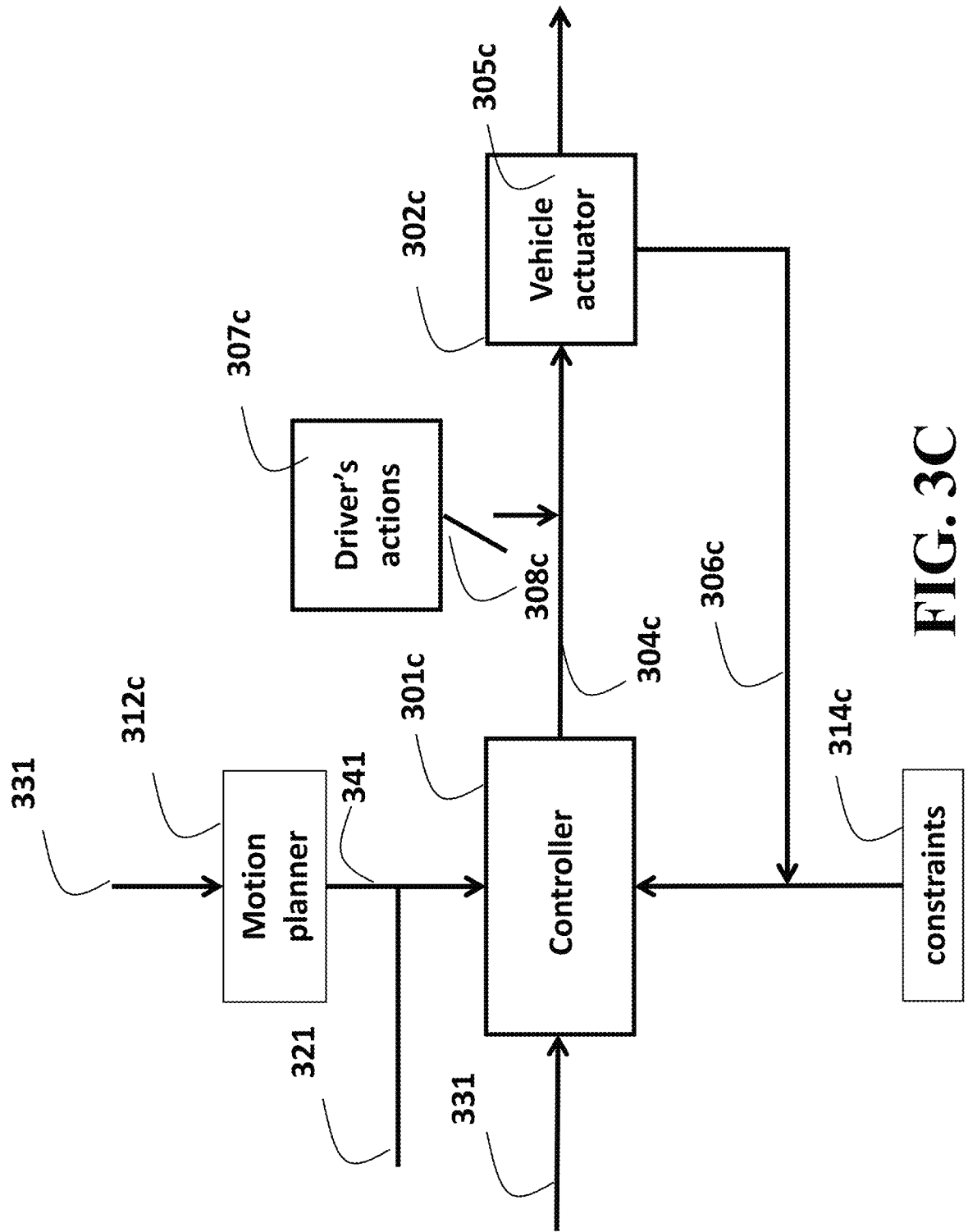
FIG. 3C shows a block diagram for how the motion planner interacts with various vehicle controllers according to some embodiments.

FIG. 3C shows a block diagram for how the motion planner interacts with various vehicle controllers according to some embodiments. In this example, the controller 301c is a model-based predictive controller that uses a motion model, the sequence of states and parametric probability distributions 341, and the information 331 from the sensing system, to optimize a cost function over a prediction horizon to produce a sequence of control commands to one or multiple actuators of the vehicle, wherein the optimization of the cost function balances a cost of tracking the sequence of the target states defined by the first moments of the parametric probability distributions against a cost of at least one other metric of the motion of the vehicle, wherein an importance of the tracking cost is weighted using one or multiple of the higher order moments of the probability distribution in the balancing optimization. For instance, the controller can be a model-predictive controller (MPC). The controller 301c can either be a stand-alone controller for autonomous driving or complementing actions of driver 307c for semi-autonomous driving. For instance, for autonomous driving the controller receives a reference trajectory 341, state and input constraints 314c, and generates a desired steering angle 304c of the wheel to control the lateral motion, and/or a desired velocity or acceleration 304c to control the longitudinal motion of the vehicle. For semi-autonomous driving, the driver 307c turns the steering wheel to obtain a steering angle 308c, possibly also with a longitudinal acceleration generated by the throttle/brake input. In such a case, the MPC can generate a correction of the driver's inputs to stabilize the vehicle in case of driving at-the-limits. In such a case, the inputs 306c from the actuators are used by the MPC.

In one embodiment, the control command is determined by solving a tracking-type optimal control problem formulation $$\min_{X,U} \frac{T}{N} \sum_{i=0}^{N-1} \|F_{ref}(x_i) - y_{ref}(\tau_i, d)\|_W^2 + \|x_i - x_{ref}\|_Q^2 +$$

$$\|u_i - u_{ref}\|_R^2 + \|F_{ref}(x_N) - y_{ref}(\tau_N, d)\|_{W_N}^2 + \|x_N - x_{ref}\|_{Q_N}^2$$

$$s.t.\ x_0 = \hat{x}_0,$$

$$x_{i+1} = F_i(x_i, u_i), \quad i = 0, \ldots, N-1$$

$$0 \geq h(x_i, u_i), \quad i = 0, \ldots, N-1,$$

$$0 \geq r(x_N),$$

where $x_{i+1} = F_i(x_i, u_i)$ is the discrete-time motion model and $0 \geq h(x_i, u_i)$, $0 \geq r(x_N)$, are the constraints 314c. The optimal control problem is known as a nonlinear programming (NLP), and there are various methods to solve this problem.

In one embodiment, the NLP is solved using sequential quadratic programming (SQP) using real-time iterations (RTIs). The RTI approach is based on one SQP iteration per control time step, and using a continuation-based warm starting of the state and control trajectories from one-time step to the next. Each iteration consists of two steps: (1) Preparation phase: discretize and linearize the system dynamics, linearize the remaining constraint functions, and evaluate the quadratic objective approximation to build the optimal control structured QP subproblem. (2) Feedback phase: solve the QP to update the current values for all optimization variables and obtain the next control input to apply feedback to the system.

Another embodiment uses block structured factorization techniques with low-rank updates to preconditioning of an iterative solver within a primal active-set algorithm. This results in a relatively simple to implement, but computationally efficient and reliable QP solver that is suitable for embedded control hardware.

In one embodiment, the MPC tracking cost is weighted with time-varying positive-definite diagonal weighting matrices, and each of the diagonal values is computed based on an inverse proportional relation to each of the corresponding individual higher order moments of the parametric probability distributions.

In other embodiments, the MPC uses time-varying positive-definite weighting matrices in the tracking cost that are computed as a stage-wise scaled inverse of the sequence of covariance matrices of the parametric probability distributions from the probabilistic motion planner. The motion planner weights the different control objectives in relation to their respective importance, to produce a suitable sequence of states and probability distributions for the MPC to control the vehicle.

However, one embodiment recognizes that the motion planner acts on a longer time scale than the MPC, such that the MPC can quicker adjust to environmental changes than the motion planner. Consequently, in one embodiment the inverse relation between the weighting matrices and covariance matrices includes a performance-specific scaling that can be relatively different for each of the tracking control objectives and a saturation function that bounds each of the time-varying positive-definite weighting matrices between lower and upper bounds for the weighting of each of the control objectives in the tracking cost function.

Referring to FIG. 3B, the motion planner can use information 359 from the MPC. For example, in one embodiment the predictive controller, such as an MPC, feedbacks the active constraints to the probabilistic motion planner configured to adjust the higher order moments of the probabilistic distribution based on type and/or number of the active constraints. This can be beneficial, for instance, when the subset of control functions selected by the motion planner needs to be adjusted to environmental changes that have not been detected by the motion planner. In such a case, the active constraints can be used as information to the motion planner which of the subset of control functions should be chosen for the MPC to perform better.

Figure 3D:
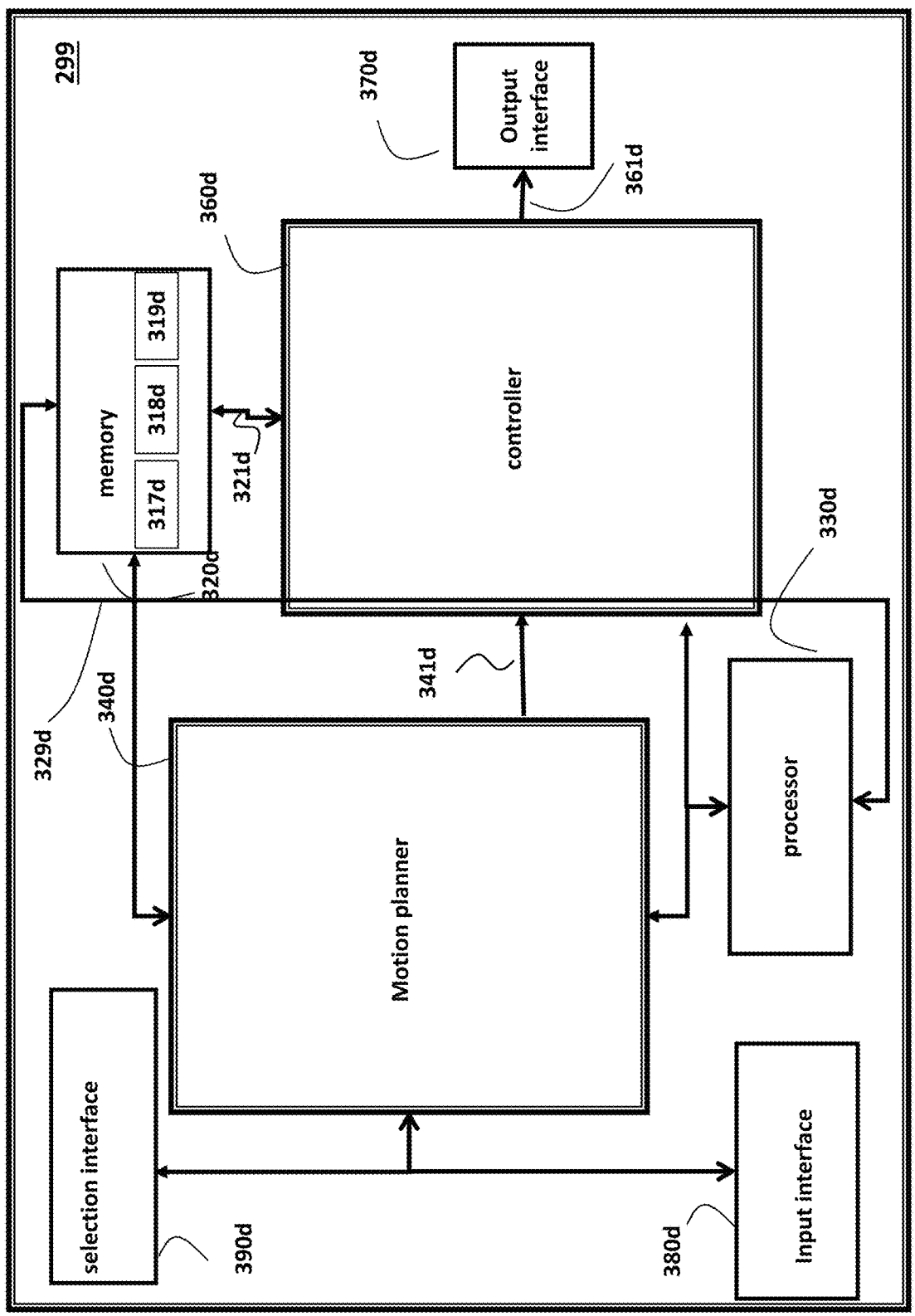
FIG. 3D shows a general structure of the connection of the input interface, selection interface, output interface, motion planner, controller, processor, and memory according to one embodiment.

FIG. 3D shows a general structure of the connection of the input interface 380$d$, selection interface 390$d$, output interface 370$d$, motion planner 340$d$, controller 360$d$, processor 330$d$, and memory 320$d$ according to one embodiment. The motion planner 340$d$ and controller 360$d$ are connected to at least one processor 330$d$ for executing modules of the motion planner 340$d$ and controller 360$d$. The processor 330$d$ is connected 329$d$ to a memory 320$d$ that stores 317$d$ a set of control functions defined by a set of probabilistic components defining different higher order moments of the target state, such as a first order, second order, and/or third order. The memory 320$d$ also stores 318$d$ a set of parameters of probabilistic components, such as elements of a mean vector, elements of a covariance matrix, elements of a skewness indicator, which defines different driving styles, such as cautious or defensive driving, normal driving, and aggressive driving. The memory 320$d$ also stores 319$d$ additional information such as the internal information of the motion planner and controller, including, but not limited to, values of the various vehicle parameters, values of each computed state of the vehicle, the various models such as motion model, and the motion leading up to each state of the vehicle.

In some embodiments, the control system maintains multiple probabilistic components for one or multiple control functions, such that different probabilistic components of the control function define different higher order moments of the target state reflected in a shift of the probabilistic distribution around the target state determined by the corresponding deterministic component. Different probabilistic components of the same control function correspond to different driving styles, e.g., an aggressive or defensive driving styles. The processor of the control system, in response to selection of one of the multiple probabilistic components of the control function, associates the control function with the selected probabilistic component for determining the probabilistic distribution around the target state determined by the deterministic component of the control function.

For example, in one embodiment the control system maintains multiple probabilistic components for the speed-limit function including an aggressive probabilistic component corresponding to an aggressive driving style and a defensive probabilistic component corresponding to a defensive driving style. In this example, a likelihood of sampling the target speed above the speed limit according to the aggressive probabilistic component is greater that the likelihood of sampling the speed above the speed limit according to the defensive probabilistic component.

Additionally, or alternatively, in one embodiment the control system maintains multiple probabilistic components for the safety-margin function including an aggressive probabilistic component corresponding to the aggressive driving style and a defensive probabilistic component corresponding to the defensive driving style. In this example, the value of the target position sampled according to the aggressive probabilistic component is more likely to be closer to the obstacle than the value of the target position sampled according to the defensive probabilistic component.

Additionally, or alternatively, in one embodiment the control system maintains multiple probabilistic components for the minimum-headway function including an aggressive probabilistic component corresponding to the aggressive driving style and a defensive probabilistic component corresponding to the defensive driving style. In this example, the values of the target velocities sampled according to the aggressive probabilistic component is more likely result in the headway smaller than the headway according to the values of the target velocities sampled according to the defensive probabilistic component.

Additionally, or alternatively, in one embodiment the control system maintains multiple probabilistic components for the change-lane function including an aggressive probabilistic component corresponding to the aggressive driving style and a defensive probabilistic component corresponding to the defensive driving style. In this example, the values of the target velocities sampled according to the aggressive probabilistic component is more likely result in a curve sharper than a curve according to the values of the target velocities sampled according to the defensive probabilistic component.

Figure 3E:
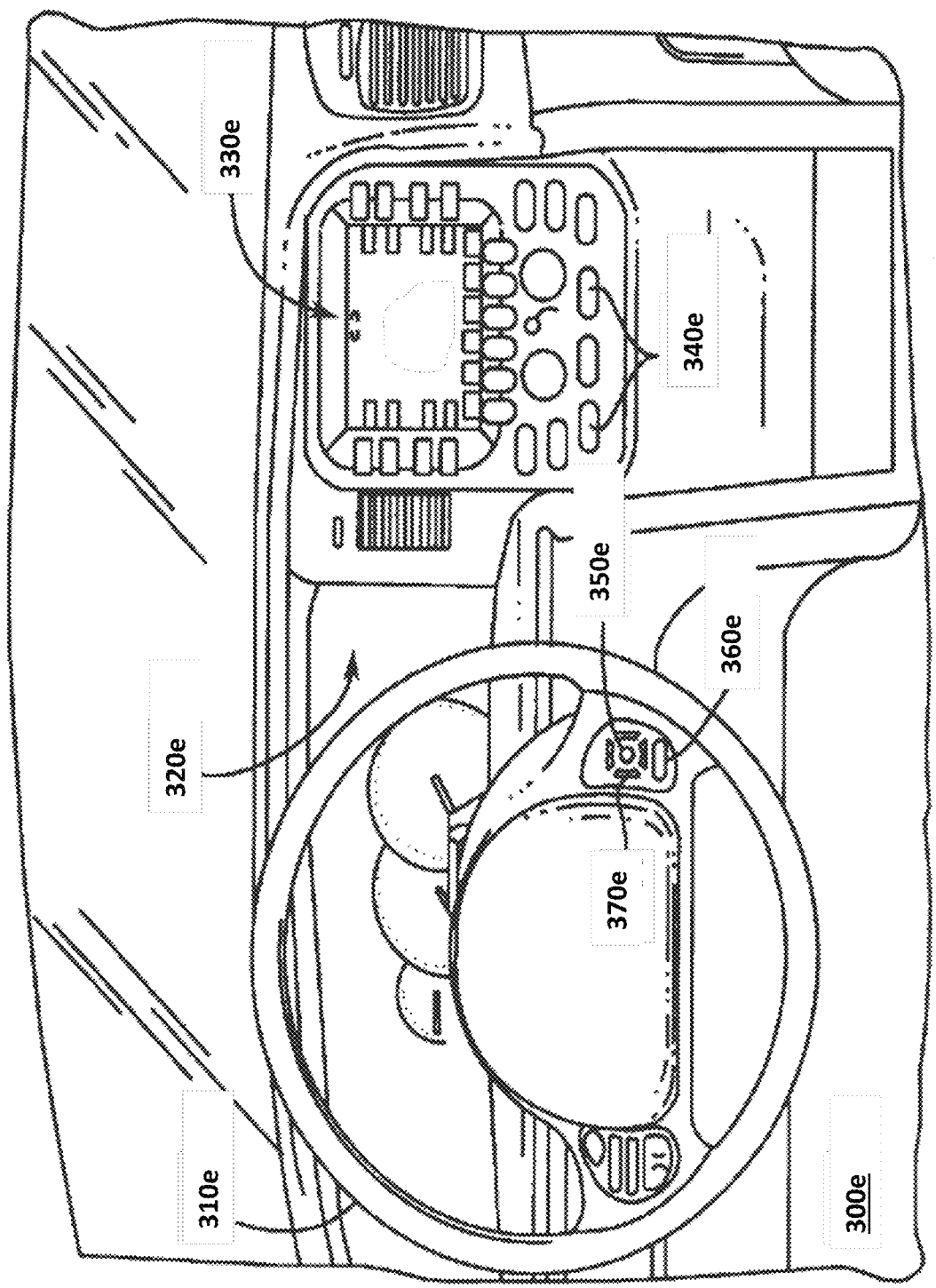
FIG. 3E shows an exemplar setup of the relevant interiors, or a user interface, of a vehicle for choosing driving style.

FIG. 3E shows an exemplar setup of the relevant interiors, or a user interface, of a vehicle for choosing driving style according to some embodiments. In these embodiments, the occupant of the vehicle can decide whether to drive in a specified driving style through a button 350e associated with the steering wheel or dashboard 340e of the vehicle. The dashboard 300e includes a steering wheel 310e with which the human operator can drive the vehicle and a display 320e for showing different modes, such as velocity and sensor outputs, of the vehicle. When in manual mode, by turning on driving style determining mode 360e, the driving style of the human operator is learned and subsequently identified as a set of control functions that resemble the driving style of the human operator.

The human operator, or another user of the vehicle, can also choose to input the driving style manually 340e. For example, an occupant of the vehicle can modify 340e the driving style by incrementally adjusting a way of driving by informing a selection interface to change the driving style according to the adjustments received from the occupant. For example, when aggressive driving style is selected, the occupant can modify this aggressive driving style to be more or less aggressive. For example, for a lane change control function, the even more aggressive style would make a sharper turn, while a control function for avoiding an obstacle would keep even closer distance with an obstacle if the occupant so desire. Similarly, when defensive driving style is selected, the occupant can modify this defensive style to be even more or less defensive. By indicating a change for less defensive style, the embodiment shifts the probabilistic component toward the aggressive style. By indicating a change for even more defensive, the embodiment can modify the probabilistic or deterministic component to make the driving more conservative.

Also included is a visualization module 330e that shows the current driving and surroundings of the vehicle and a button 370e for adding new driving styles, or refinements of the already included driving styles of the vehicle, over the air as they become available. Also included in 340e is a car-navigation system, or an equivalent system, which the human operator can use to insert a final driving decision of the vehicle, and the car-navigation system then provides waypoints, or intermediate target positions to the vehicle.

FIGS. 4A through 4E show illustration of a subset of possible control functions and its respective deterministic and probabilistic components according to some embodiments of the invention.

Figure 4A:
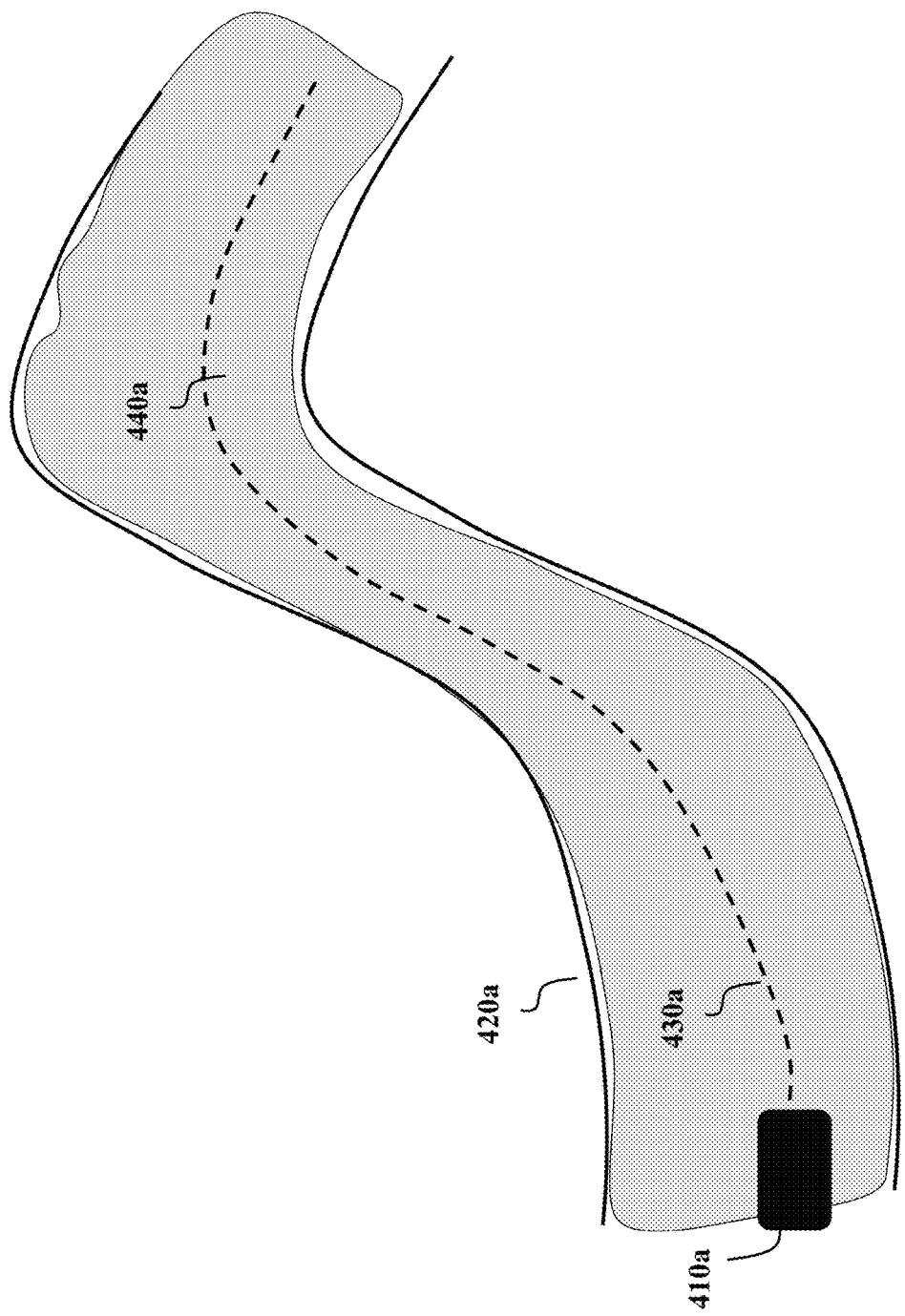
FIG. 4A shows an illustration of the control function corresponding to the control objective keeping the vehicle on the road.

FIG. 4A shows an illustration of the control function corresponding to the control objective keeping the vehicle 410a on the road 200, wherein the road boundaries are defined by 420a. The control function is defined by the deterministic component 430a and the probabilistic component 440a. The deterministic component can be determined, for example, by recording data of human drivers and optimizing the fit, for example, by minimizing the average Euclidean distance to the data or by maximizing the probability of being a good fit. The probabilistic component 440a can be determined by determining the variation of the recorded data around the deterministic component 430a. For example, the probabilistic component 440a can be determined by maximizing the probability of including all of the recorded data inside the variation of the probabilistic component 440a, or it can be determined by estimating the actual variation of an infinite amount of data given the finite amount of recorded data.

Figure 4B:
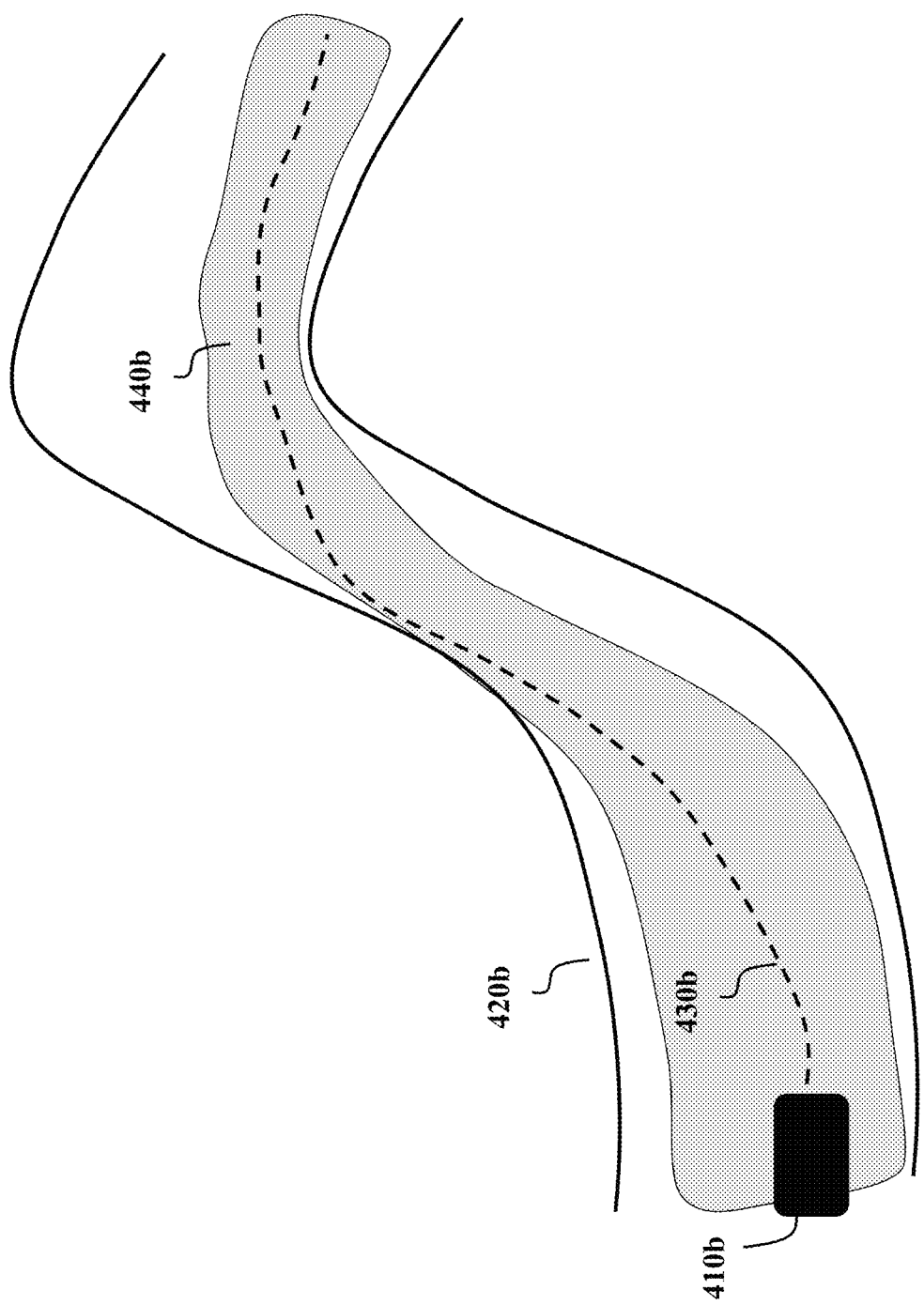
FIG. 4B shows an illustration of the control function corresponding to the control objective shortening the vehicle travel time on the road.

Some embodiments are based on the recognition that while it is possible to model a control function as one limited by the road boundaries 420a, this is not the way humans drive. Instead, humans may decide to cut corners in turns to provide for a shorter ride. FIG. 4B shows an illustration of the control function corresponding to the control objective shortening the vehicle 410b travel time on the road, wherein the road boundaries are defined by 420b. The control function is defined by the deterministic component 430b and the probabilistic component 440b. The deterministic component can be determined, for example, by recording data of human drivers and optimizing the fit, for example, by minimizing the average Euclidean distance to the data or by maximizing the probability of being a good fit. The probabilistic component 440b can be determined by determining the variation of the recorded data around the deterministic component 430b. For example, the probabilistic component 440b can be determined by maximizing the probability of including all of the recorded data inside the variation of the probabilistic component 440b, or it can be determined by estimating the actual variation of an infinite amount of data given the finite amount of recorded data.

Figure 4C:
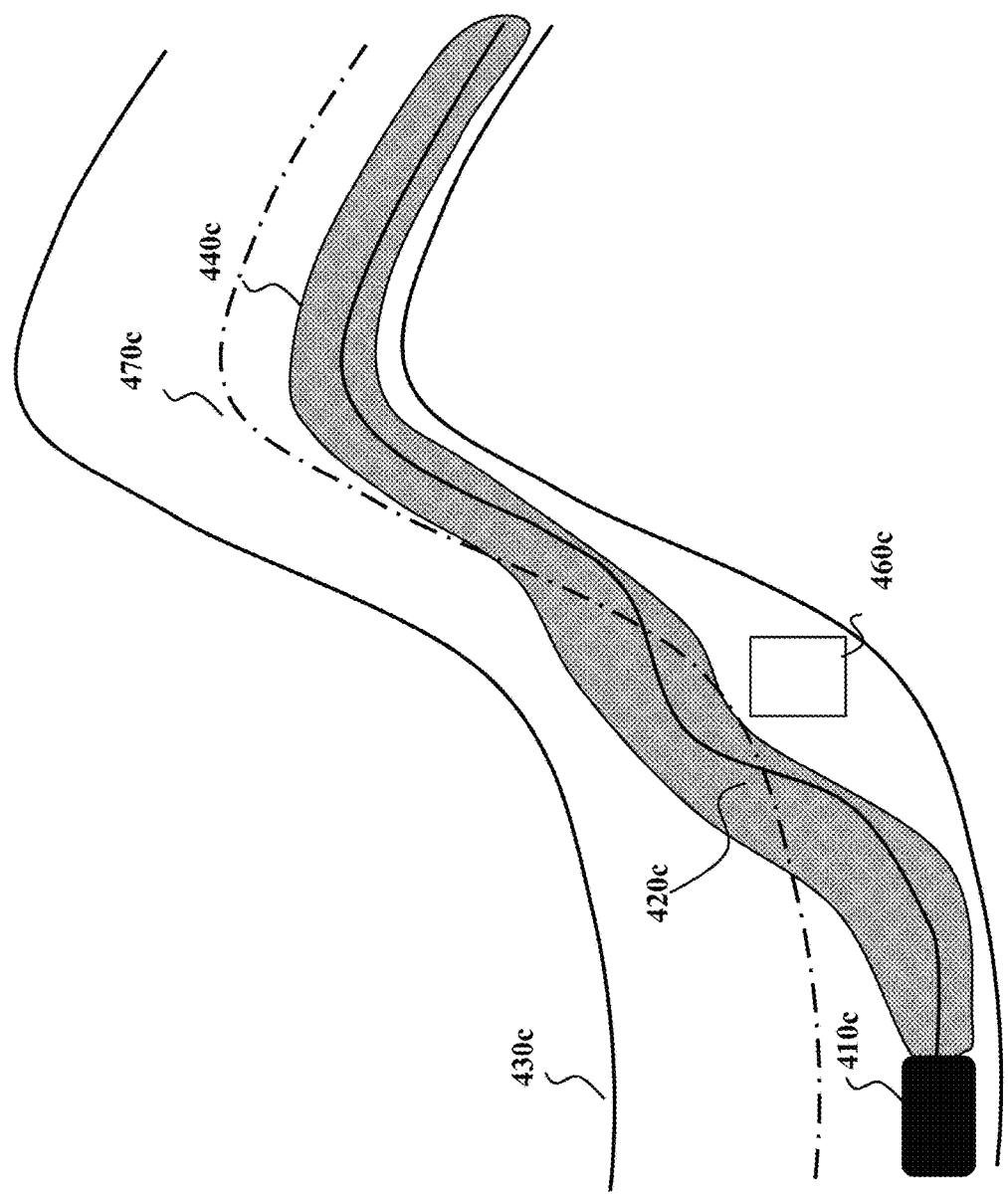
FIG. 4C shows an illustration of a control function for expressing the driving objective of safely overtaking a vehicle.

FIG. 4C shows an illustration of a control function for expressing the driving objective of safely overtaking a vehicle 460c, wherein the vehicle 410 drives on a two-lane road with lane boundary 470c. The deterministic component 420c can for example by determined from data collected for human drivers in similar situations. The probabilistic component 440c indicates that not every situation is the same, and that drivers typically behaves slightly differently depending on how the other vehicle 460c behaves. Consequently, the probabilistic component 440c indicates a larger variation in the area where the overtaking is executed.

Figure 4D:
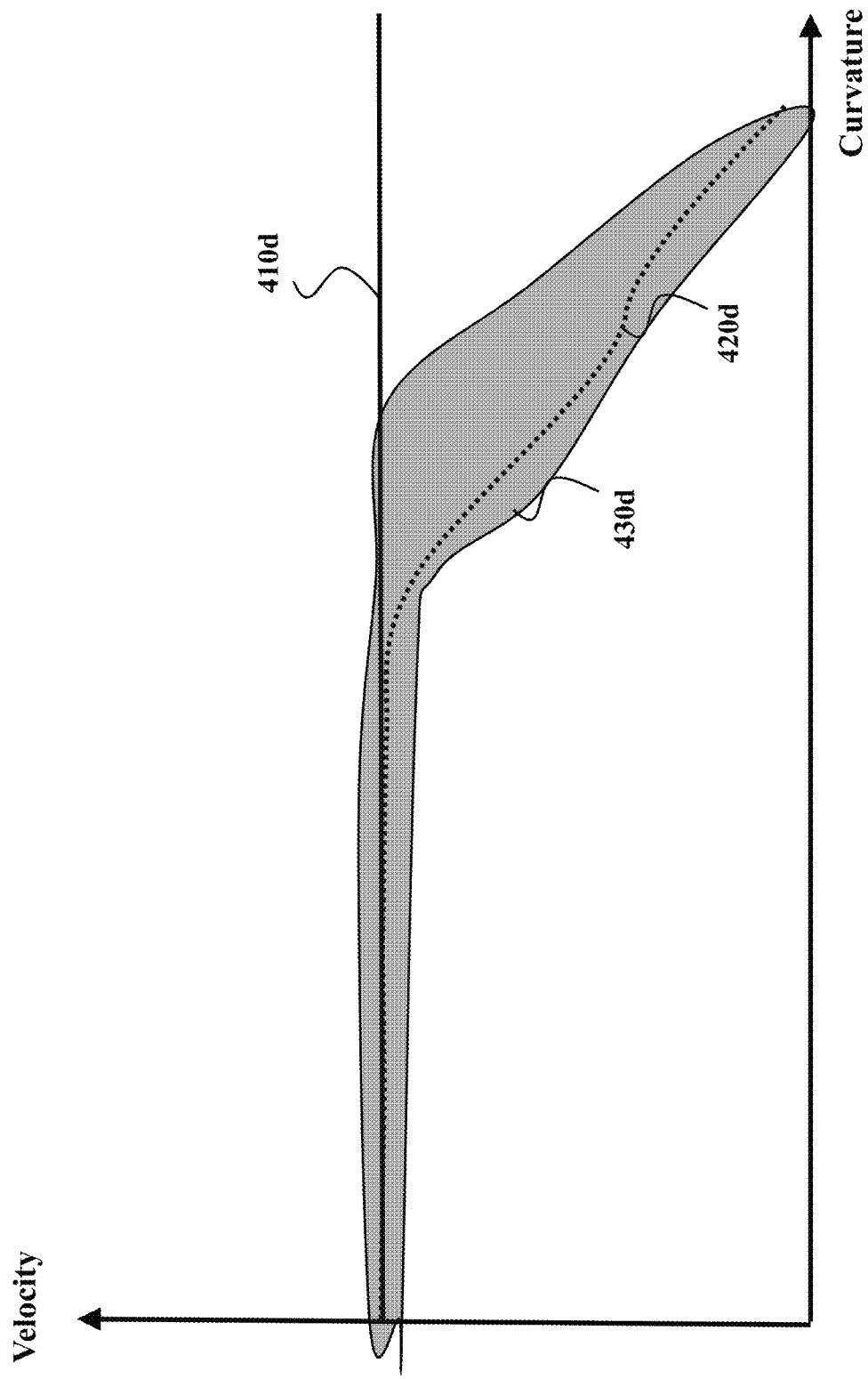
FIG. 4D shows an illustration of a possible way to describe a control function of the objective to maintain the current speed according to some embodiments.

FIG. 4D shows an illustration of a possible way to describe a control function of the objective to maintain the current speed 220 according to some embodiments. FIG. 4D shows a case where the velocity is modeled as a function of the curvature of the road, i.e., a measure of the turning radius of the road. For small curvature, i.e., almost straight road, the control function has a deterministic component 420d that is equal to the current speed 410d. However, as the curvature increases the current speed is harder to maintain, and the deterministic component reduces to zero. Moreover, as shown in FIG. 4D, for small curvature the probabilistic component 430d is centered around the nominal speed with small variation. However, as curvature increases there is a larger nonsymmetric variation to reflect the larger variation of speeds a driver exerts.

FIG. 4E shows an illustration of a possible way to describe a control function of the driving objective of driving smoothly 250 according to one embodiment. A control function can be modeled in several ways. FIG. 4E shows an example where the smoothness is described as a control function of acceleration. The deterministic component 410e is centered around zero acceleration, and the probabilistic component 420e is nonsymmetric to indicate that a human operator typically allows for faster negative decelerations for dangerous situations than a large positive acceleration, since those situations are typically not associated with traffic safety.

Several embodiments of the invention use probabilistic control functions decomposed as a deterministic component and a probabilistic component, and combine these probabilistic control functions together to determine a sequence of states and a sequence of associated probability distributions, which can be used for controlling the vehicle.

Figure 4F:
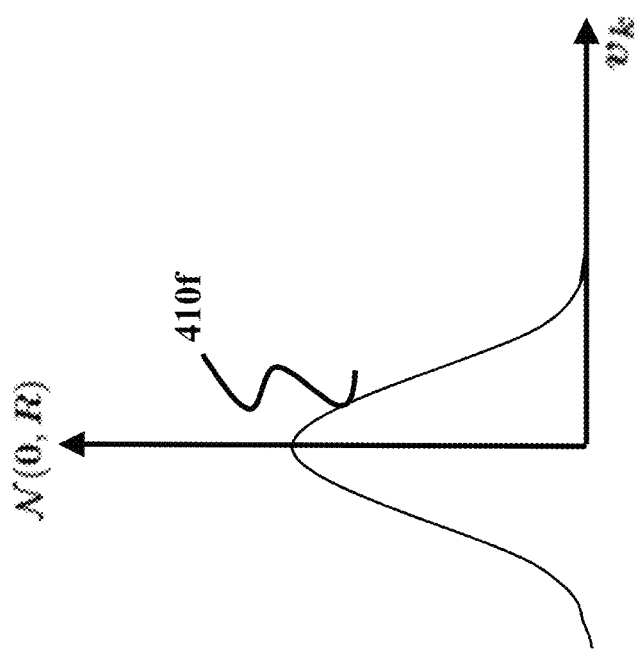
FIG. 4F shows an illustration of a Gaussian component with covariance according to one embodiment

In some embodiments, the probabilistic components of the control functions are modeled as the combination of deterministic component and probabilistic component as $y_k=h_\theta(x_k, u_k)+v_k$, wherein $h_\theta$ is the deterministic component with parameters $\theta$ that can be used to customize the deterministic components to specific driving styles. In other embodiments, the probabilistic components are modeled as zero-mean Gaussian distributed, i.e., $v_k \sim \mathcal{N}(0, R)$, with covariance R' that can be adapted to different driving styles and to account for noise in the environment and sensors. FIG. 4F shows an illustration of a Gaussian component 410$f$ with covariance according to one embodiment.

Some embodiments combine the probabilistic control functions with a probabilistic motion model, $x_k=f(x_{k-1})+g(x_{k-1})u_k$, wherein x is the state including a vehicle velocity and heading, and possibly other entities. The deterministic components f and g are known. However, to account for uncertainties in a driver's decisions and modeling errors, the control input is in one embodiment modeled as a zero-mean Gaussian prior distribution $u_k \sim \mathcal{N}(0, Q)$. In several embodiments the probabilistic components R' and Q are determined to customize the control functions and subsequent motion sequences to different driving style preferences.

In some embodiments the driving style is gradually personalized as data are gathered. For human passengers who have not demonstrated their driving style, the probabilistic components use common covariance matrices $Q^c$ and $R^c$. Similarly, the deterministic components use common parameters $\theta^c$.

Figure 4G:
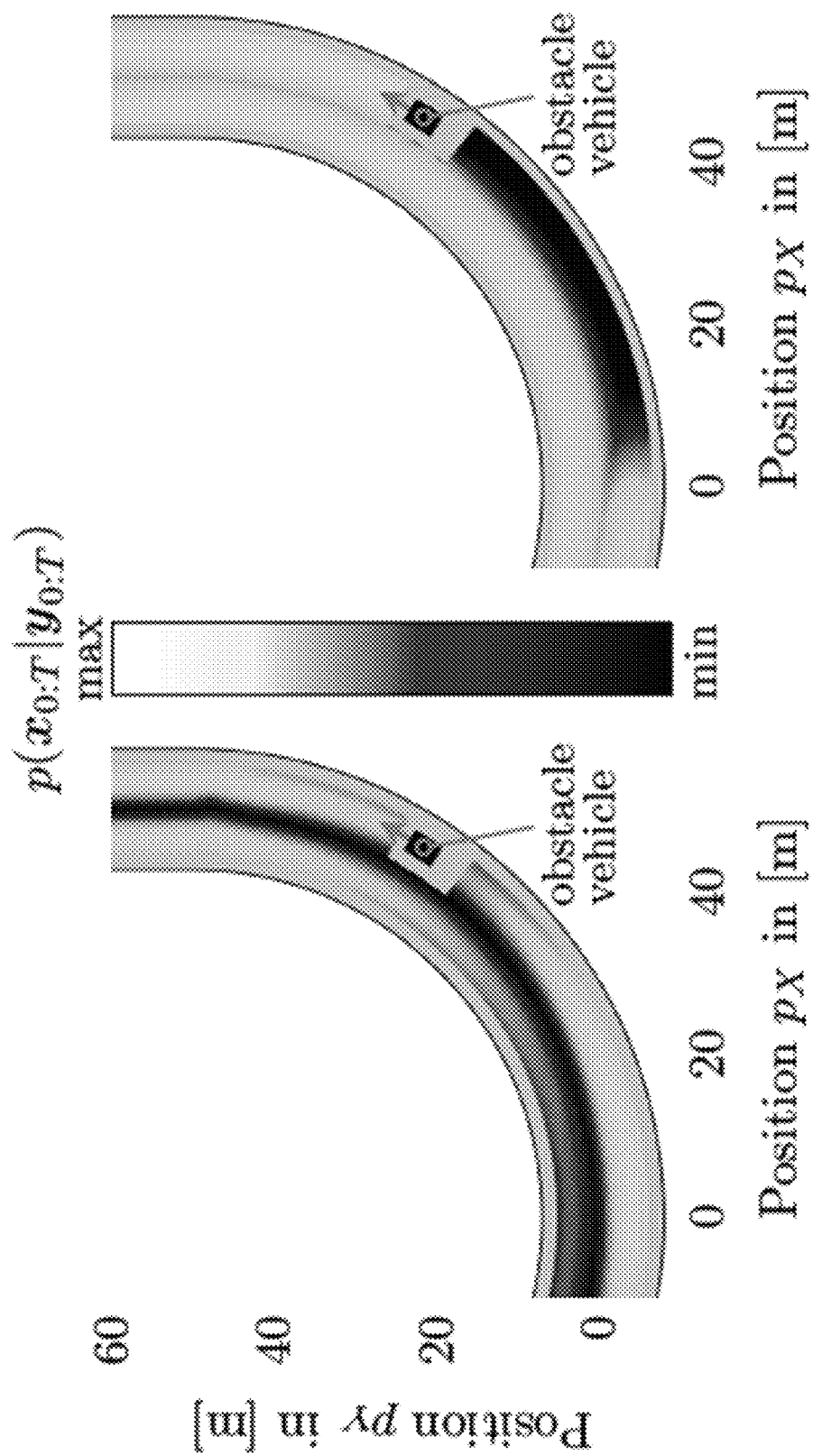
FIG. 4G illustrates the concept of probabilistic control functions resulting in a sequence of states and associated probability distribution function and how decision making can differ between humans.

FIG. 4G illustrates the concept of probabilistic control functions resulting in a sequence of states and associated probability distribution function and how decision making can differ between humans. FIG. 4G displays the probability distribution of the states given outputs from control functions for two realizations of parameters of the probabilistic control functions with one moving obstacle vehicle, wherein the color map indicates initial conditions that are more or less likely. To the left is an example of using a set of common parameters that are fitted to an average, or normal, driver, and the right part of FIG. 4G shows the result for parameters of personalized driver, in this case a more aggressive driver. In this illustrative example, the personalized motion planner is likely to overtake the obstacle vehicle during the turn (low probability when trailing the obstacle vehicle), whereas the motion planner with the common parameters is more likely to stay behind the obstacle vehicle (low probability for switching lanes).

Some embodiments determine the probabilistic components from the distribution $p(Q,R|Q^c,R^c,x_{0:T},y_{0:T})$ $\propto p(x_{0:T},y_{0:T}|Q,R,Q^c,R^c)p(Q,R|Q^c,R^c)$, where $x_{0:T}$ and $y_{0:T}$ are the observed state and control function outputs, respectively, from time step k=0 to time step T, $p(Q, R|Q^c, R^c)$ is a prior probability and $p(x_{0:T},y_{0:T}|Q,R,Q^c,R^c)=p(x_{0:T},y_{0:T}|Q,R)$ is the likelihood of the observations.

In some embodiments, the probabilistic control input resulting in a sequence of states when transition using the motion model, is determined as the probabilistic components are determined as a probabilistic component and a component correcting the input to reflect the deterministic component of control function, $u_k=K_k(y_k-h_\theta(f(x_{k-1}), 0))+\sigma_k$, wherein $K_k=Q(H_kG_k+D_k)^T\Gamma_k^{-1}$ $\Gamma_k=(H_kG_k+D_k)Q(H_kG_k+D_k)^T+R$ $\Sigma_k=(I-K_k(H_kG_k+D_k))Q$.

Some embodiments determine the probabilistic components as a function of the control input over the sequence of data, $Q=1/T\Sigma_{k=1}^T u_k u_k^T$ and $R=1/T\Sigma_{k=1}^T v_k v_k^T$.

Some embodiments determine the probabilistic components by so-called likelihood maximization, wherein the probabilistic components are determined by maximizing the likelihood:

$$\max_{Q,R} \log(p(x_{0:T}, y_{0:T} | Q, R)p(Q, R | Q^c, R^c))$$

$$\text{s.t. } Q \in C_Q, R \in C_R,$$

Wherein $C_Q$, $C_R$ can be used to enforce constraints, e.g., symmetry and positive definiteness $Q=Q^T \succeq 0, R=R^T \succeq 0$ Some embodiments solve the maximum likelihood problem by a projected gradient descent algorithm, wherein the cost to be minimized is $c(\xi^i)=-\log(p(x_{0:T},y_{0:T}|Q,R)p(Q,R|Q^c,R^c))$, which is the negative likelihood, wherein
$\xi^i=[\text{vec}(Q^i)^T \text{vec}(R^i)T]^T$ is a vectorized representation of the probabilistic components.

Figure 4H:
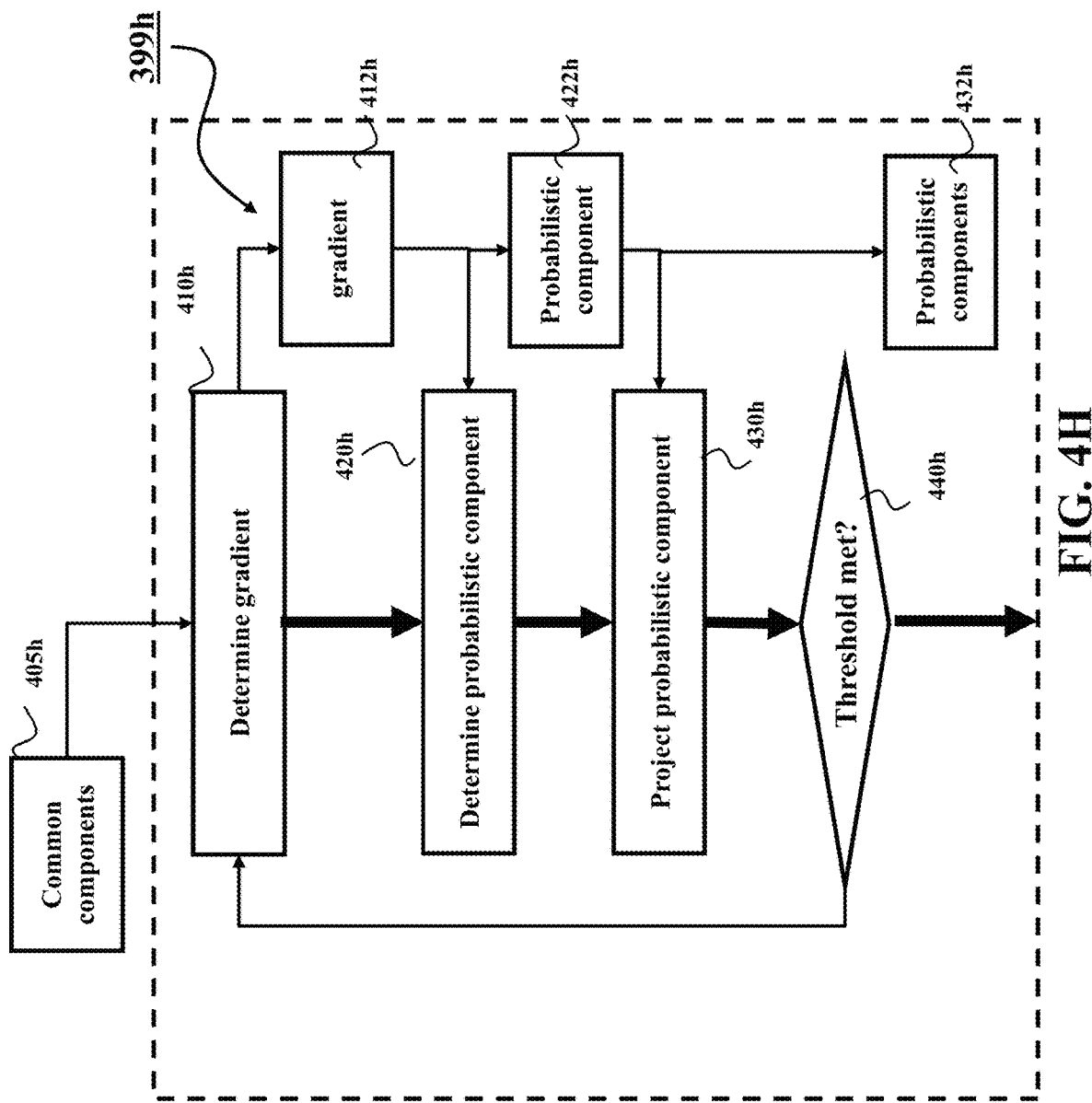
FIG. 4H shows a flowchart of a method for determining the probabilistic components of control functions according to one embodiment.

FIG. 4H shows a flowchart of a method 399$h$ for determining the probabilistic components of control functions according to one embodiment. The method is initialized with a set of common components 405$h$ either set by a designer of the method or by predetermined components for an average driver. Then, the method determines 410$h$ the gradient 412$h$ of the likelihood conditioned on the common components 405$h$. Using the determined gradient, the method determines 420$h$ probabilistic components by moving the probabilistic components in a direction determined by the gradient using a step length. The updated probabilistic components 422$h$ are projected 430$h$ to satisfy constraints on the probabilistic components. If a threshold 440$h$ is met the method outputs 432$h$ the probabilistic components, otherwise it iterates with the updated projected probabilistic components using an updated step length. In some embodiments, the threshold is determined as the size of the step length. One embodiment sets the termination criterion as the step length being below a small number, wherein the step length is updated in each iteration. One embodiment determines the step length by using backtracking line search, where the idea is to reduce the step length from an initial value l until a strict cost decrease is achieved. For example, one embodiment determines the step length as in FIG. 4I, wherein the step length is set to $l \leftarrow l/\gamma^{n_a}$ at the end of each iteration.

In some embodiments, the projection 430$h$ is used to enforce positive definite covariance matrices using a spectral decomposition.

Figure 5A:
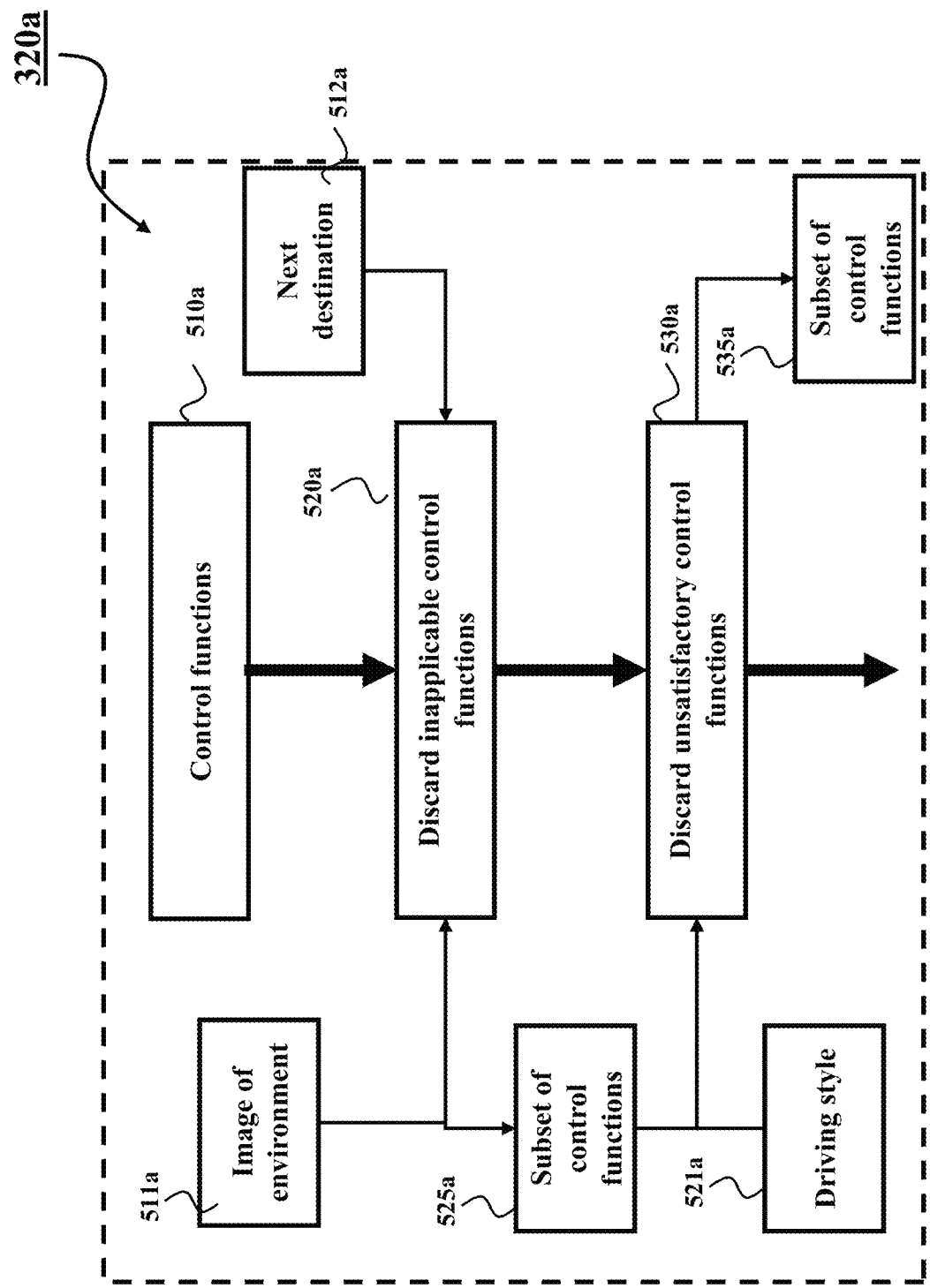
FIG. 5A shows a flowchart of a method for selecting a subset of control functions according to one embodiment.

There may be many more control functions defined than are relevant for a particular situation. FIG. 5A shows a flowchart of a method 320$a$ for selecting a subset of control functions according to one embodiment. The method retrieves from a memory the set of control functions 510a. Using an image of the environment 511a of the vehicle and information of the next driving decision 512a, the method discards 520a inapplicable control functions. For example, if the next driving decision is to stop at a red light on a one-lane road, the control functions related to change lane 270 and increase speed 260 can be discarded.

Then, using the first subset 525a of control functions and a preferred driving style 521a inputted by an occupant of the vehicle, the method 320a discards unsatisfactory control functions. For example, if the occupant of vehicle chooses a very aggressive driving style, the control function for the driving objective to maintain safety margin 230 to other vehicle can be discarded.

Sometimes there may be several control functions that express the same driving objective but with different probabilistic parameters, to give different probability distributions. For example, changing lane 270 can be done in multiple ways, and depending on the chosen driving style 521a, different control functions, or parameters of control functions, associated with the same driving objective can be chosen instead of other control functions.

Some embodiments are based on realization that probabilistic components of the control function can encode driving style of the passengers. For example, the deterministic component of the control function can be determined for a normal driving style, while the probabilistic component of the control function can represent deviation from the normal style. For example, the control function can be associated with multiple probabilistic components mapped to different driving styles. For example, for a lane changing driving objective, the probabilistic component of the control function outputs a path resembling a sigmoid function. The probabilistic component corresponding to the aggressive driving style shape the distribution covering the sigmoid function to increase likelihood of using sharper turns than prescribed by the curvatures of the sigmoid function. To that end, some embodiments include a set of probabilistic components for at least some control function in the set to allow a selection of the probabilistic component to reflect the driving style.

The different driving styles can be associated with different control functions and the different driving styles can be defined in different ways. For instance, the driving style normal driving can be defined as the driving style with deterministic, probabilistic, and associated parameters defined by an average of determined parameters for a set of human operators. Similarly, a defensive driving style can be defined as a driving style that does not overtake unless absolutely necessary, and that maintains a maximum allowed distance to surrounding vehicles. In the same way, an aggressive driving style can be defined as a driving style trying to minimize the deviation of a velocity to the speed limit. In other words, the allowed variation around that speed limit is kept to a minimum while ensuring vehicle safety.

Figure 5B:
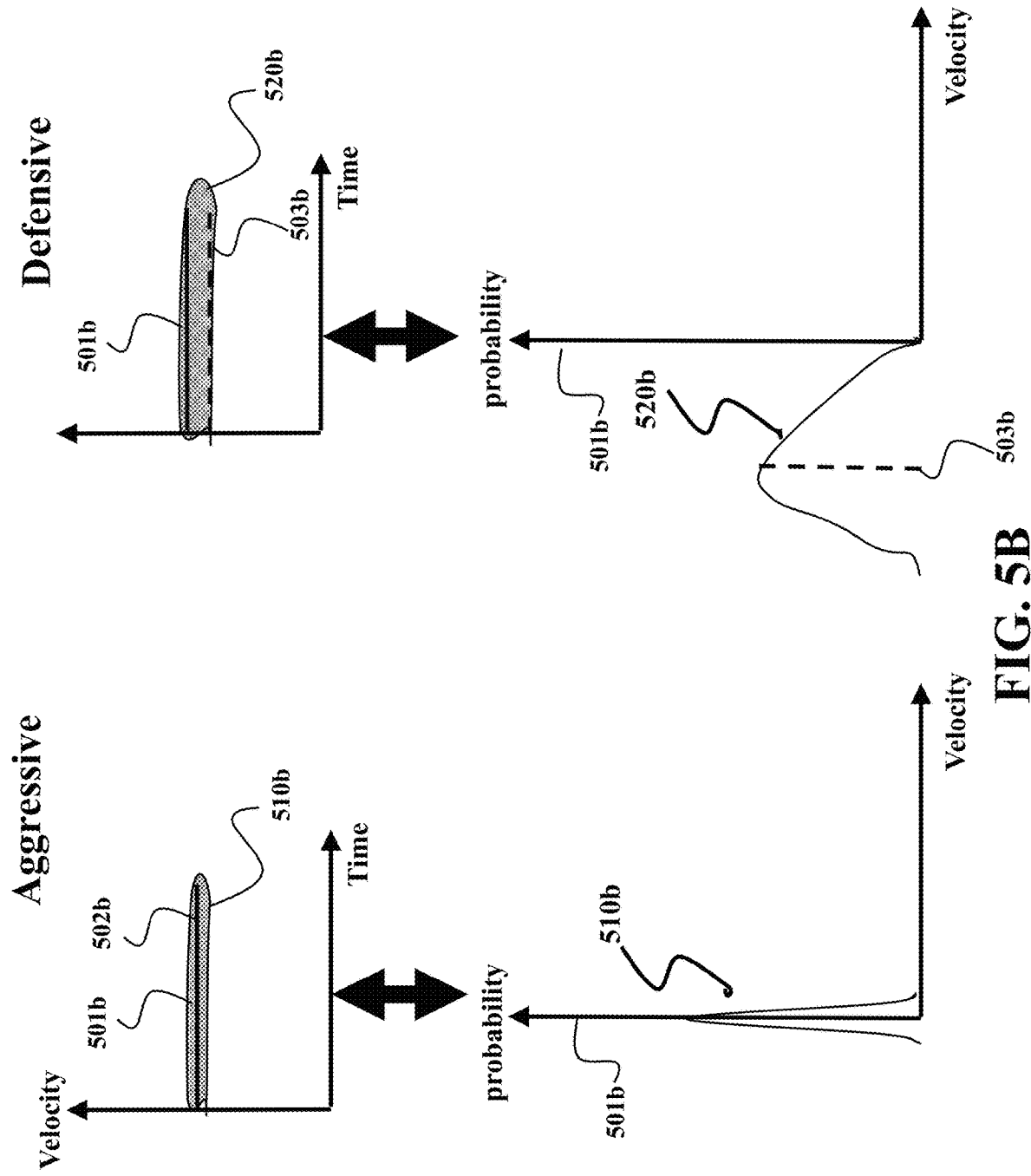
FIG. 5B shows an illustration of components of control functions for different driving styles.

The different driving styles can be defined by the deterministic and probabilistic components of a control function. FIG. 5B shows an illustration of components of control functions for different driving styles. As an exemplar illustration the examples of aggressive (left) and defensive (right) style is taken, and the driving objective of maintaining speed limit is chosen. The aggressive driving style has deterministic component 502b of control function for velocity driving objective of maintaining speed limit 501b to be the same as speed limit 501b, and the probabilistic component 510b is close to zero. However, the defensive driving allows for a larger variation of velocities particularly around velocity regions that are lower than the speed limit, with a lower deterministic component.

Figure 5C:
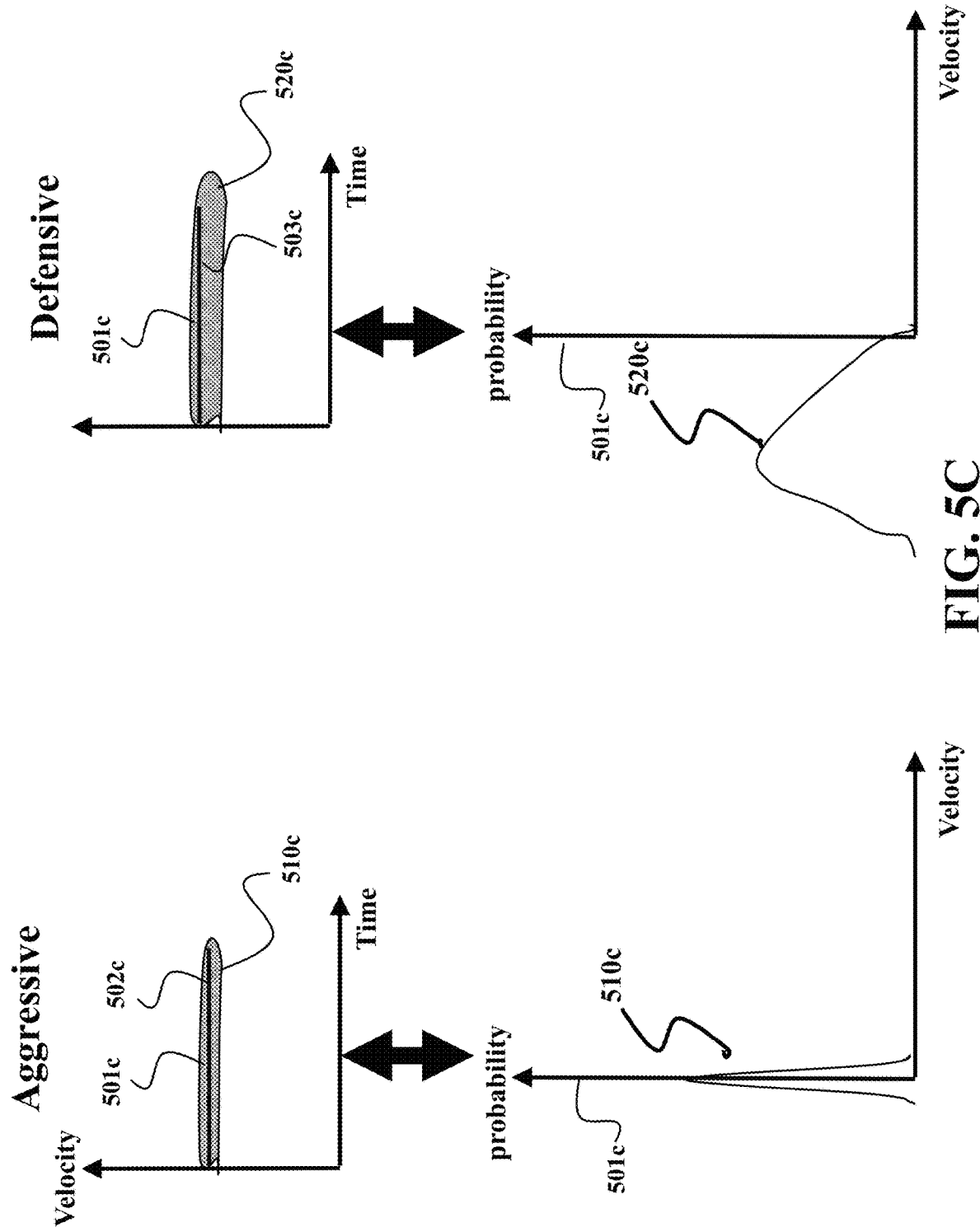
FIG. 5C shows an illustration of components of control functions for different driving styles.

FIG. 5C shows another illustration of components of control functions for different driving styles. Here, the deterministic component 502c and 503c are identical to the speed limit 501c, and the probabilistic component entirely defines the driving style. For instance, the probabilistic component 520c for defensive driving is larger and skewed toward lower (i.e., more defensive) velocities than the corresponding probabilistic component 510c for aggressive driving.

Figure 5D:
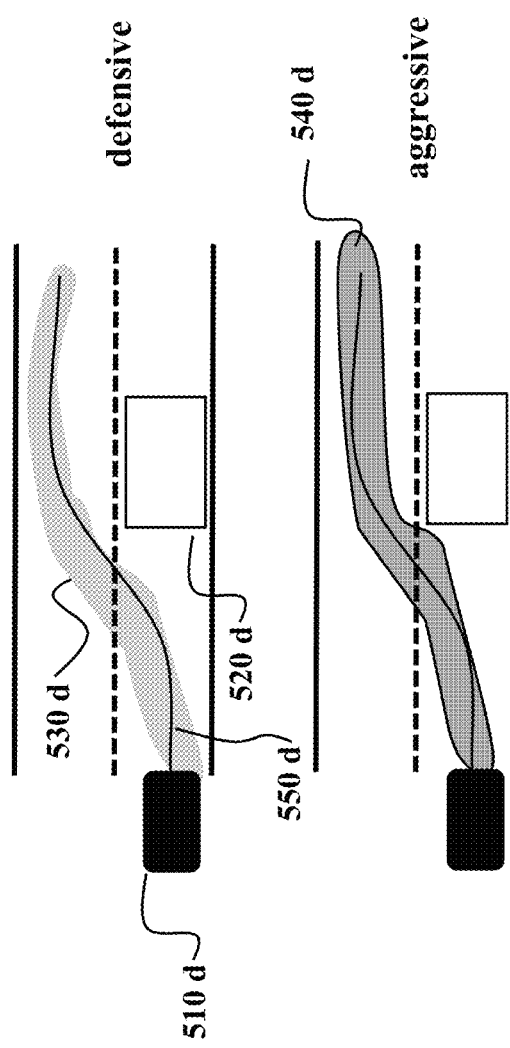
FIG. 5D shows an illustration of how the probabilistic component can be used to distinguish between driving styles.

FIG. 5D shows another illustration of how the probabilistic component can be used to distinguish between driving styles. An autonomous vehicle 510d is performing a lane change to overtake another vehicle 520d on a two-lane single-directed road. The deterministic component 550d is the same for both aggressive and defensive driving in this example, and they can be obtained, for example, by optimizing a difference between recorded driving data and the function fit by a numerical, i.e., iterative, procedure. For the defensive driving style, the probabilistic component 530d is skewed toward distances farther away to the obstacle 520d, to make sure enough precaution is taken to account for variations of behaviors on the road and sensing uncertainties. On the other hand, the aggressive driving style has a probabilistic component that is more centered around the deterministic component, i.e., in this particular case the deterministic component more reflects the mean for the aggressive style than the defensive style.

Several embodiments use prior designed control functions to determine a sequence of states and probability distributions. For example, control functions for driving objectives as in FIG. 2A. One embodiment uses the deterministic components $$h_\theta(x_k, u_k) = \begin{bmatrix} h^l(pX, k, pY, k) \\ v_{x,k} \\ h_\theta^c(a_{x,k}, a_{y,k}) \\ h_\theta^o(d_k, v_{x,k}) \end{bmatrix},$$

Wherein $h^l(p_X, p_Y)$ is the squared distance from the centerline of the road at vehicle position $p_X, p_Y$, representing the driving objective of staying in the middle of a target lane, $v_x$ is the current velocity modeling the objective to maintain a nominal velocity $v_{nom}$, $h_\theta^c(a_x, a_y)$ is a component for driving objective of passenger comfort with longitudinal acceleration $a_x$ and lateral acceleration $a_y$ acting on the vehicle, and $h_\theta^o(d, v_x)$ is a component for obstacle avoidance with separation distance d between obstacle and vehicle. The ideal output from the control functions is $$y_k = \begin{bmatrix} 0 \\ v_{nom} \\ 0 \\ 0 \end{bmatrix},$$

and several embodiments use various principles to determine the deterministic components to reflect the control functions and modeled outputs.

One embodiment models the deterministic component of passenger comfort objective as a penalty for longitudinal and lateral accelerations, as well as their coupling. The accelerations and their coupling relate to the individual driving style, where less cautious drivers tend to exercise simultaneous acceleration and steering, whereas more cautious drivers tend to do either. In one embodiment the deterministic part of passenger comfort control function is $$h_\theta^c(a_x, a_y) = \bar{a} \cdot \frac{c_\theta(a_x, a_y) - c^0}{c^1 - c^0}$$

Figure 5E:
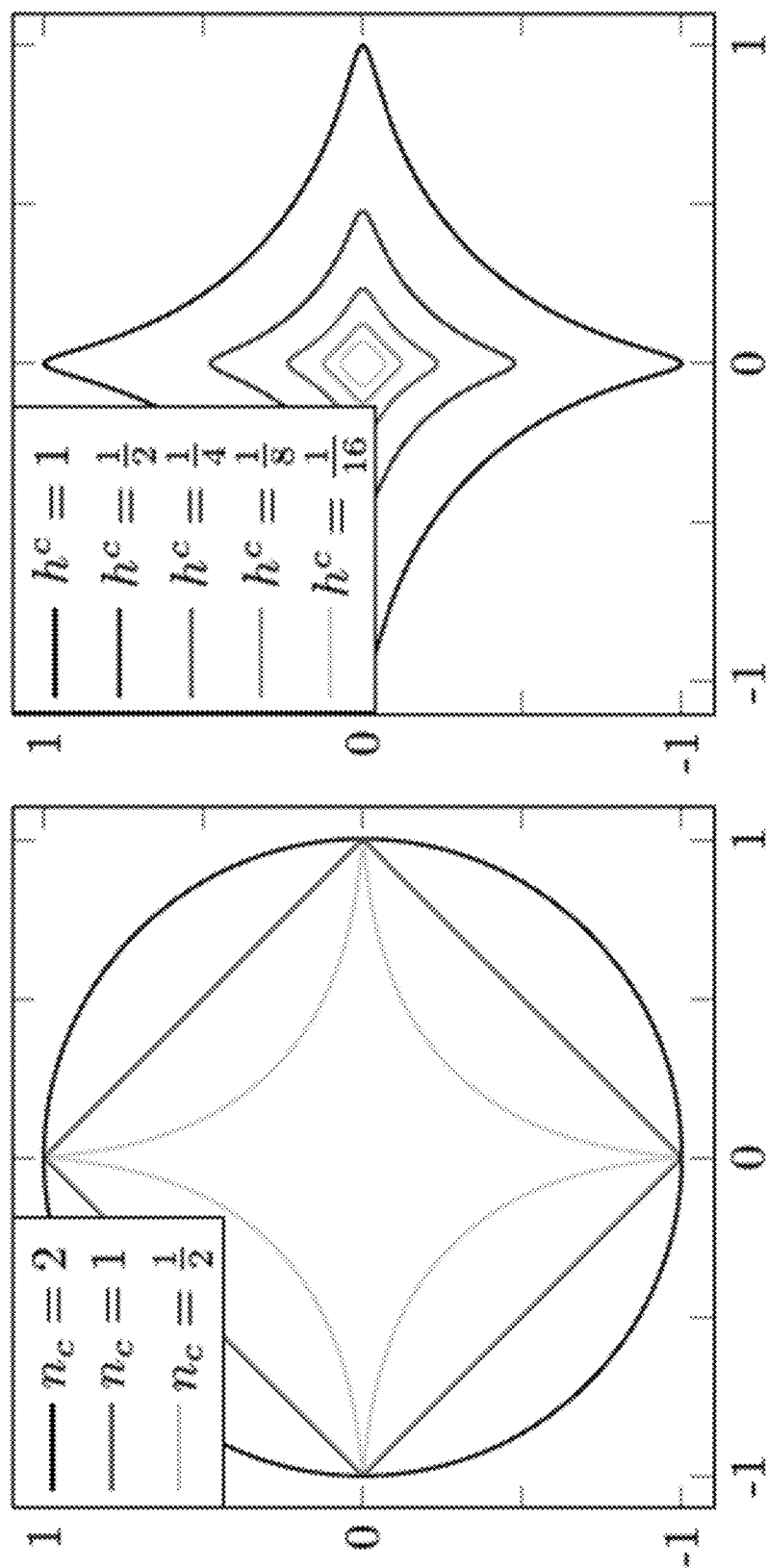
FIG. 5E shows examples of the deterministic part of passenger comfort control function for different parameters determined by other embodiments.

With $$c^1 = \left(\sqrt{(\alpha^2 + \epsilon)}^{-n_c} + \sqrt{\epsilon}^{-n_c}\right)^{\frac{1}{n_c}}, \quad c^0 = (2\sqrt{\epsilon}^{-n_c})^{\frac{1}{n_c}}$$

and $$c_\theta(a_x, a_y) = \left(\sqrt{(\alpha_x^2 + \epsilon)}^{-n_c} + \sqrt{((s \cdot a_y)^2 + \epsilon)}^{-n_c}\right)^{\frac{1}{n_c}}$$

for some parameter s defining unilateral scaling and exponent $n_c$ whose impact is shown in FIG. 5E. FIG. 5E shows examples of the deterministic part of passenger comfort control function for different parameters determined by other embodiments.

Another embodiment models the deterministic component of obstacle avoidance control function as a piecewise linear function $$h_\theta^o(d, v_x) = \begin{cases} \frac{1}{t_s}(d_{min} + t_s v_x - d) & \text{if } d_{min} + t_s v_x \geq d \\ 0 & \text{else,} \end{cases}$$

Where $d_{min}$ is the minimum distance to an obstacle, and $t_s v_x$ is the traveled distance of the vehicle within the safety time $t_s$ at velocity $v_x$ and considers that safety distance is velocity dependent.

The parameters distinguishing different driving styles are determined by determining $\theta=[s \; n_c \; d_{min} \; t_s]^T$ for different driving styles, i.e., individualized driving styles.

In one embodiment the parameters are determined as a combination of prior, common, parameters $\theta^c$ and personalized parameters $\theta^p$, wherein the combinations is determined as $$\theta = \frac{\sigma_\theta^2}{\sigma_\theta^2 + 1}\theta^p + \frac{1}{\sigma_\theta^2 + 1}\theta^c$$

wherein the term $\sigma_\theta^2$ is the variance.

Various embodiments of the invention determine the parameters using different methods. For example, one embodiment determines the scaling parameter $s^p$ as ratio between longitudinal and lateral accelerations, wherein each acceleration is represented by the median as measure of central tendency. Using the median instead of the mean increases robustness to measurement outliers. In other words, $s^p$ results from the median of the M largest longitudinal accelerations and divided by the median of the M largest lateral accelerations.

Figure 5F:
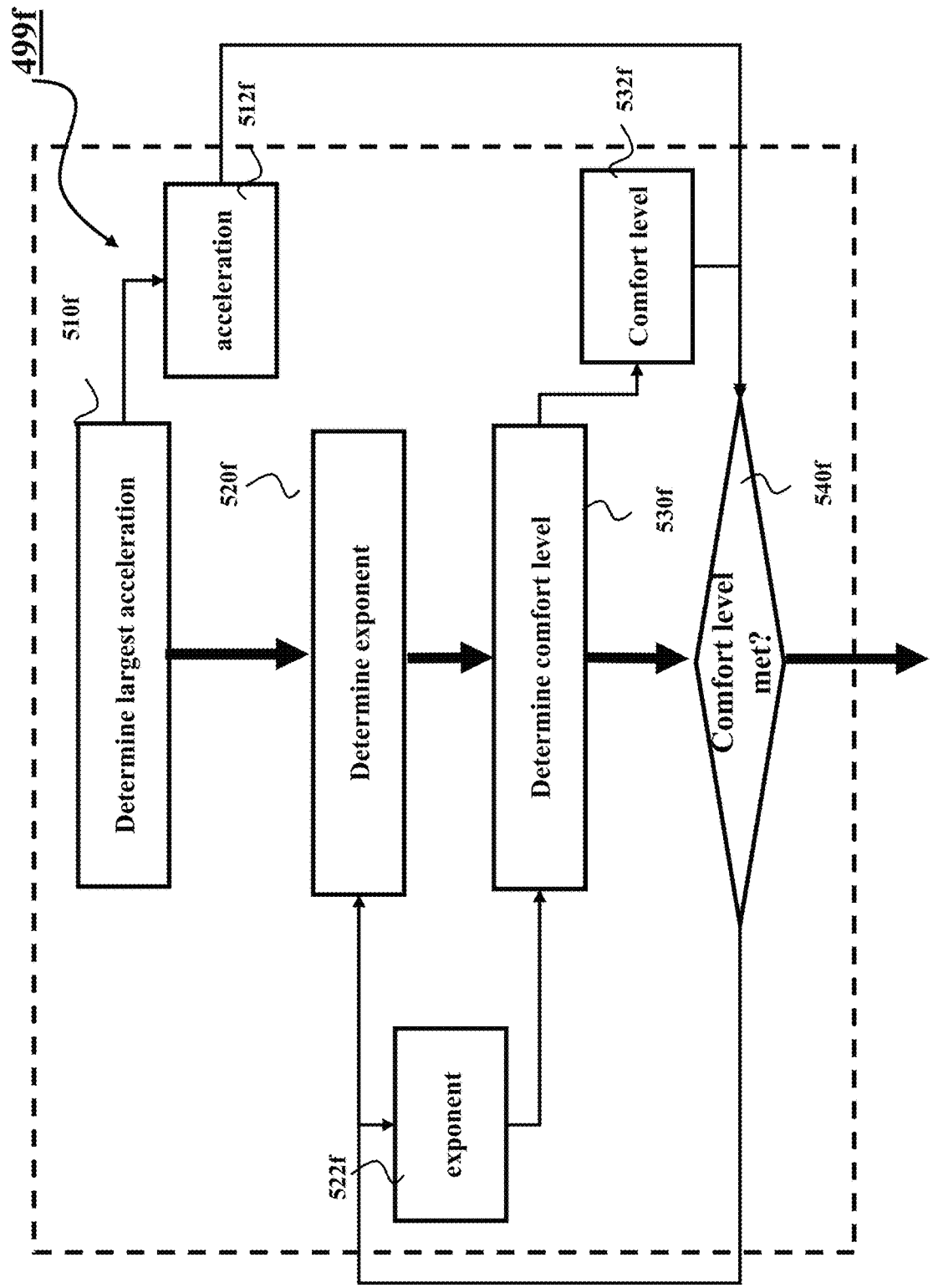
FIG. 5F shows a flowchart of a method for determining an exponent defining the shape of level sets according to one embodiment.

FIG. 5F shows a flowchart of a method 499f for determining the exponent $n_c^p$ defining the shape of level sets $$h_\theta^c(a_x, a_y) = \bar{a} \cdot \frac{c_\theta(a_x, a_y) - c^0}{c^1 - c^0}.$$

The method determines 510f the largest acceleration defined as the value of the level set of the largest accelerations in the data. Then, the method determines 520f an exponent 522f. Using the determined exponent 522f, the method determines 530f the comfort level 532f by inserting the acceleration and exponent into the level sets of passenger comfort control function.

If a comfort level is met 540f, the method outputs the determined exponent 522f, otherwise it determines 520f a new exponent.

One embodiment determines 510f $a_{max}$ 512f as the median of the M largest elements in absolute value of the set defined by $\mathcal{A}_x \cup (s \cdot \mathcal{A}_y)$, wherein $s \cdot \mathcal{A}_y = \{s \cdot a_{y,0}, \ldots, s \cdot a_{y,T}\}$ is a scaling of the lateral acceleration data, and wherein $\mathcal{A}_x = \{a_{x,0}, \ldots, a_{x,T}\}$.

Another embodiment determines 530f the comfort level 522f by evaluating the median of the set of M largest components of the lateral and longitudinal accelerations.

The comfort level requirement can be determined in several ways. One embodiment determines whether the comfort level has been met 540f by comparing the comfort level 532f with the acceleration 512f.

In one embodiment, the deterministic component of control function for obstacle avoidance has two parameters that need to be determined, $d_{min}$ the minimum distance to an obstacle, and the safety time $t_s$. The determination of these parameters rely on the recognition that the collected data originate from either of two models: driving with or without traffic. One embodiment switches between these two models at a distance $d_{min}^p = d - t_s^p v_x$, where $d_{min}^p < d - t_s^p v_x$ indicates traffic free, and $d_{min}^p > d - t_s^p v_x$ is traffic-affected driving.

One embodiment determines $d_{min}^p$ as the maximum value of the M smallest observed distances. Doing in such a manner ensures that while customizing the behavior, the vehicle does not get too close to the obstacle. It can be interpreted as a more robust and conservative determiner than, e.g., the smallest distance.

The safety time $t_s$ can be determined in several ways. One embodiment determines the safety time by testing multiple values from a lower limit to a maximum limit, and evaluating a cost that is a combination of a sum of deviations of control inputs from a mean control input for traffic-free driving and deviations of control inputs from a mean control input for traffic-affected driving.

Using the learned deterministic and probabilistic components for an occupant of vehicle, the probabilistic control functions can be used to determine a sequence of states and probability distributions.

Figure 6A:
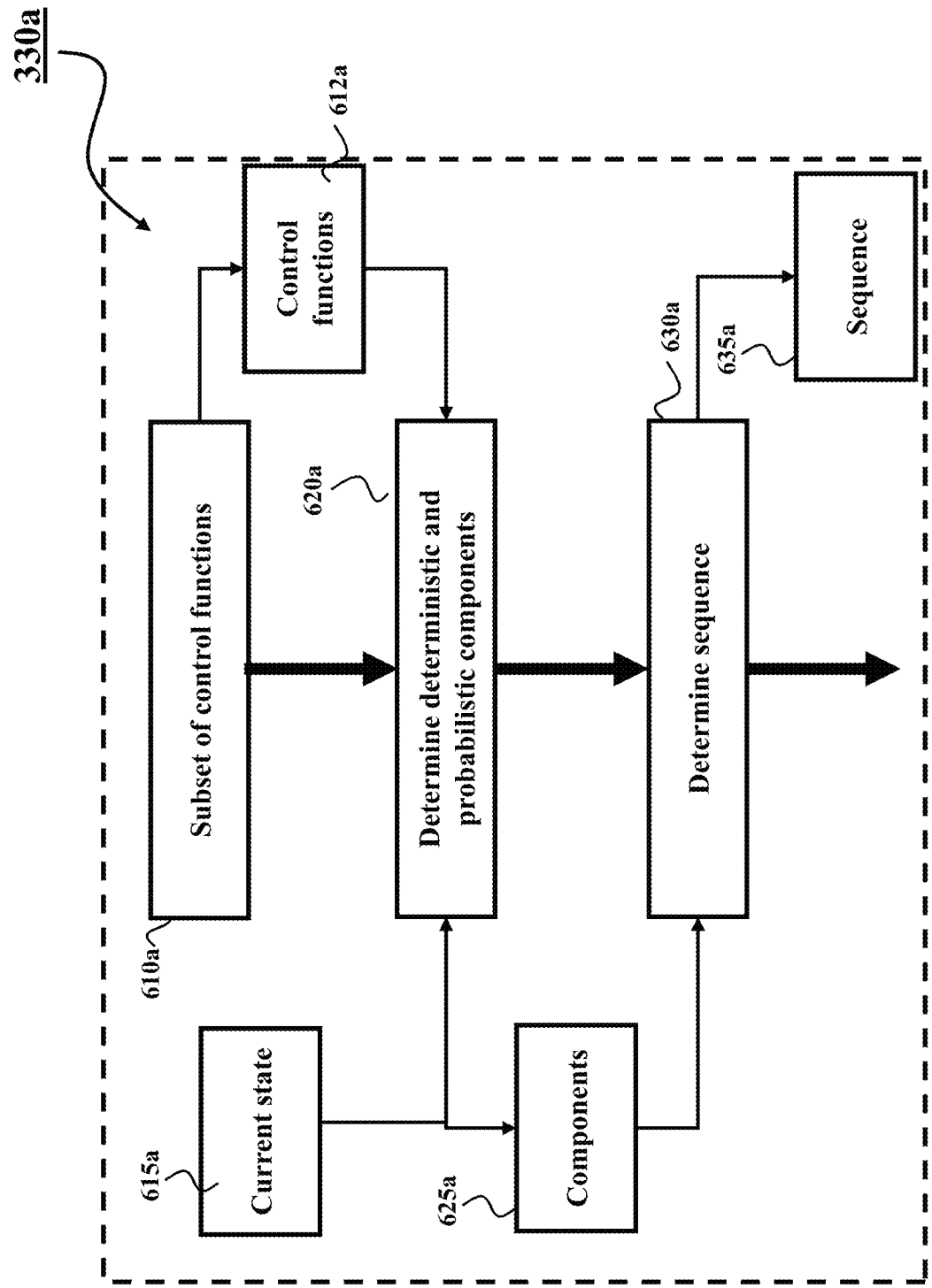
FIG. 6A shows a flowchart of a method for submitting the current state into the selected control functions.

FIG. 6A shows a flowchart of a method 330a for submitting the current state into the selected control functions 325a to produce a subset of sequence of parametric probability distributions 335a over a sequence of states defining a motion plan for the vehicle reaching the target state. The method uses the determined subset 610a and the current state 615a determined from e.g. a sensing system of the vehicle, and produce 620a an associated set of probabilistic components defining different higher order moments of the target state with each control functions, to produce a set 625a of deterministic and probabilistic components defining a subset of control functions. Then, the method iterates 630a the deterministic and probabilistic components 625a to produce a sequence 635a of states and associated probability distributions that define a motion plan for each control function in the subset of control functions.

Some embodiments are based on realization that probabilistic components of the control function can encode importance of the function in generating a sequence of states that balances multiple control objectives. For example, in some embodiments, the importance of the control objective is inversely proportional to a variance of the probabilistic component of the control function. Some embodiments use this relationship for combining outputs of multiple control functions to estimate the target states for a path of a vehicle. Different selection of different driving styles may rebalance the combination of the probabilistic distributions. For instance, for a defensive driving style it is more important to maintaining safety distance to surrounding obstacles than obeying the speed limit.

Figure 6B:
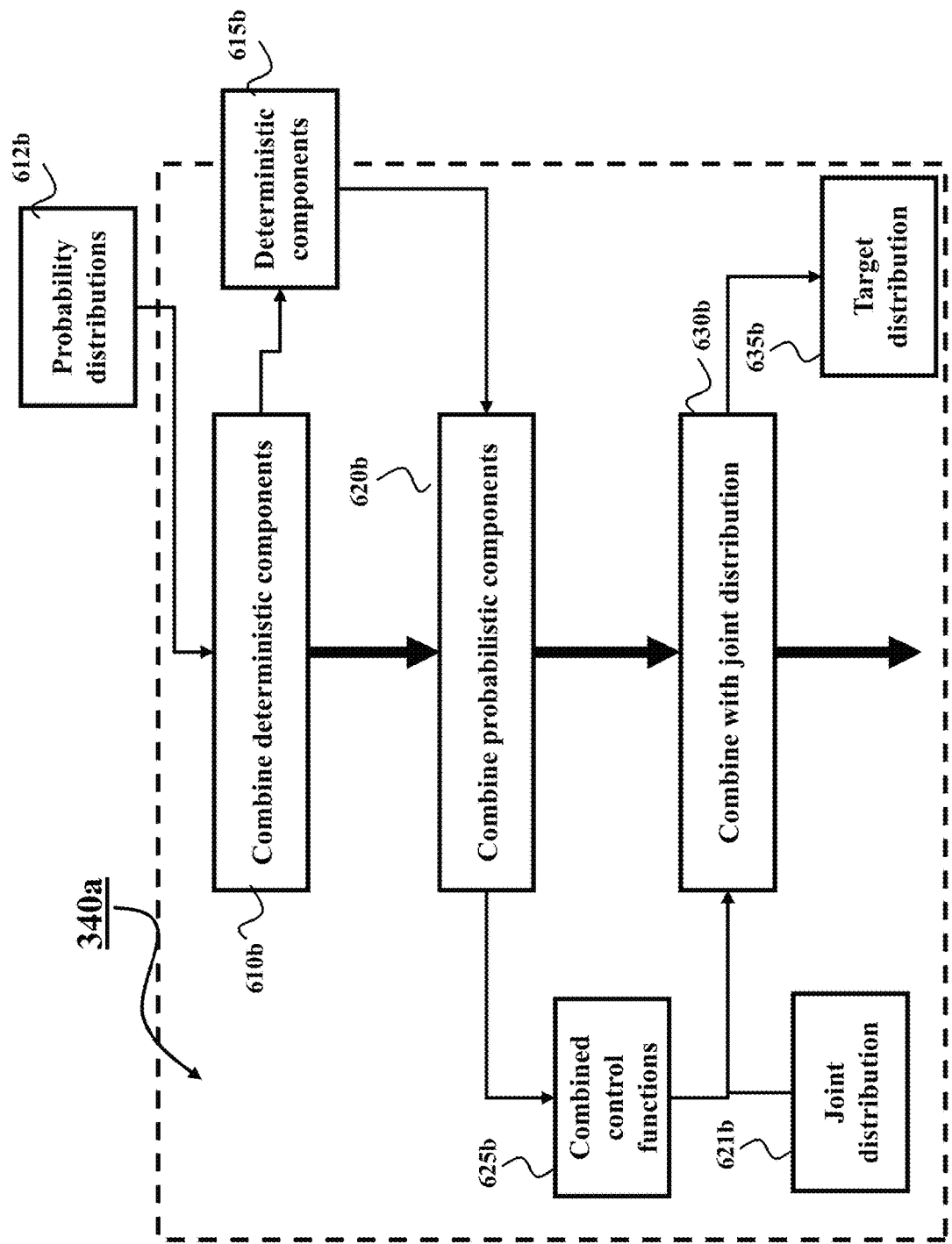
FIG. 6B shows a flowchart of a method for combining control functions and encoding importance of the functions relative to each other.

FIG. 6B shows a flowchart of a method 340a for combining control functions and encoding importance of the functions relative to each other. The method uses the determined sequence 612b of states and probability distributions to combine 610b the deterministic components from the sequence of deterministic components, into a joint deterministic component 615b. Then, the method combines 620b the probabilistic components to produce a combined 625b sequence of control functions. Using a joint distribution function 621b, the method combines 630b the combined control functions 625b with the joint distribution function 621b to produce a sequence of target distributions 635b that can be used to control the vehicle according to some embodiments.

Figure 6C:
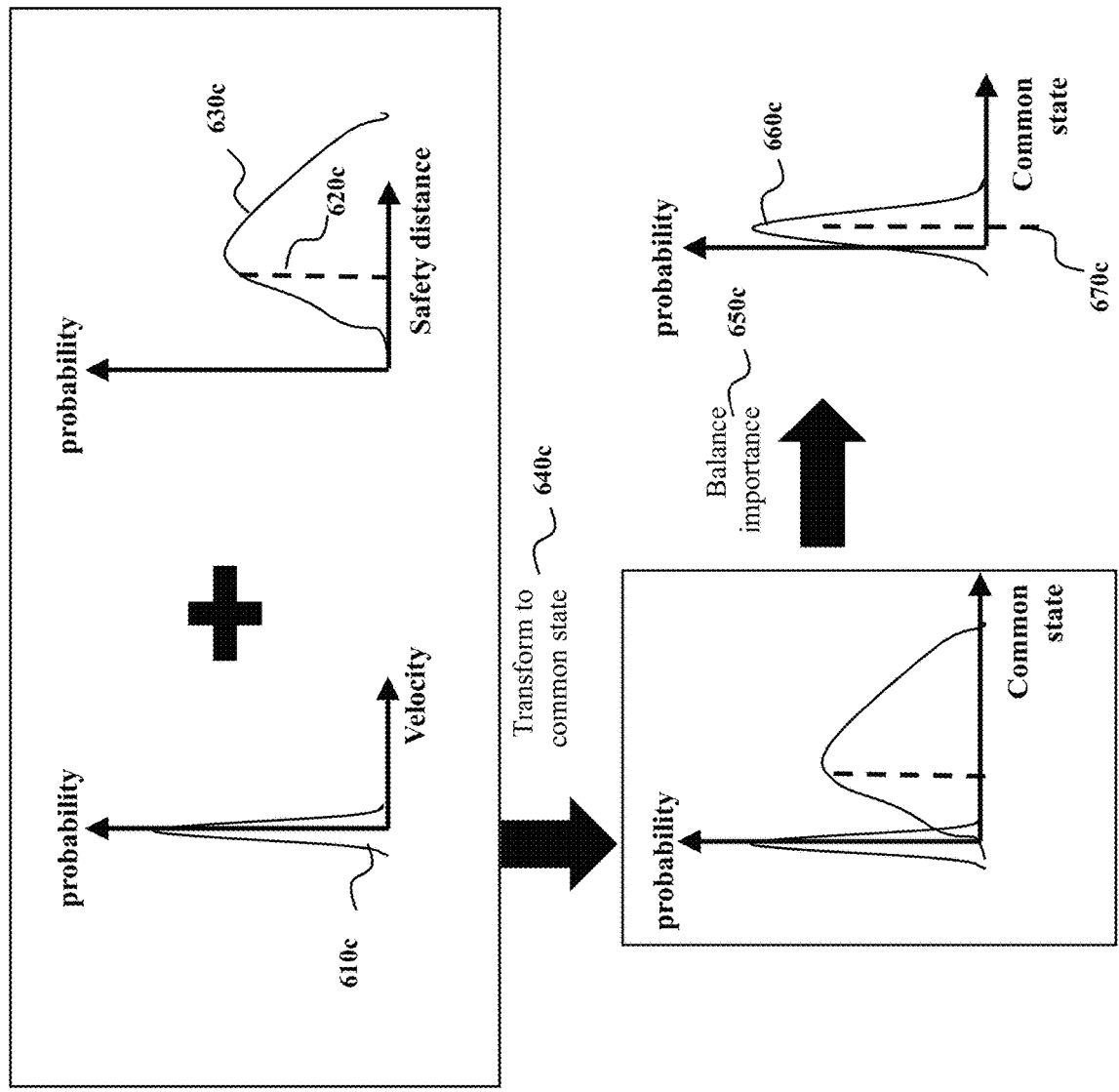
FIG. 6C shows an illustration a method for how to balance the importance of different control functions according to some embodiments.

FIG. 6C shows an illustration a method for how to balance the importance of different control functions according to some embodiments. FIG. 6C shows a situation where there are two driving objectives expressed as control functions, maintaining a nominal velocity and maintaining a safety distance. The velocity requirement is expressed as a function of deviation of velocity from a nominal velocity and the safety distance is expressed as a Euclidean distance from the autonomous vehicle to an obstacle on the road. The deterministic component for the velocity control function is zero and the probabilistic component is a narrow shape 610c centered on the deterministic component. On the other hand, the safety distance requirement has a deterministic component 620c that is nonzero and a probabilistic component 630c that allows for a large variation around the deterministic component. Also, in this illustrative example the deterministic component is not centered at the mean of the probabilistic component. Since the velocity is not the same as distance, the velocity and safety distance control functions are transformed 640c to a common state, where the control functions can be compared. Then, the control functions are combined 650c into a joint distribution, which weights together the control functions. For example, in FIG. 6C the joint distribution balances 650c the importance into the common deterministic component 670c and the probabilistic component 660c, which both are closer to the respective components of the velocity control functions since the probability distribution of the velocity control function has a much smaller variation 610c than the probabilistic component 630c of the safety distance control function.

The joint distribution can be chosen in multiple ways. For instance, if the probabilistic components for each control function for each step in the sequence are Gaussian distributed, the joint distribution can be chosen as a multivariate Gaussian distribution, wherein the weighting of importance of each control function is weighted by the inverse of the covariance for each component.

The deterministic components can be chosen in multiple ways. For instance, one embodiment combines the deterministic components by stacking them in a vector such that they constitute a mean of the Gaussian distribution.

Even though the probabilistic component for each step in the sequence is Gaussian distributed, the sequence of distributions, especially when combined, will be non-Gaussian. For instance, the deterministic component can be a nonlinear function mapping the current state to a control function output, which causes the sequence to be non-Gaussian distributed. To determine a sequence of combined states and distributions in such a case, numerical approximations can be used, e.g., by sampling.

Figure 7A:
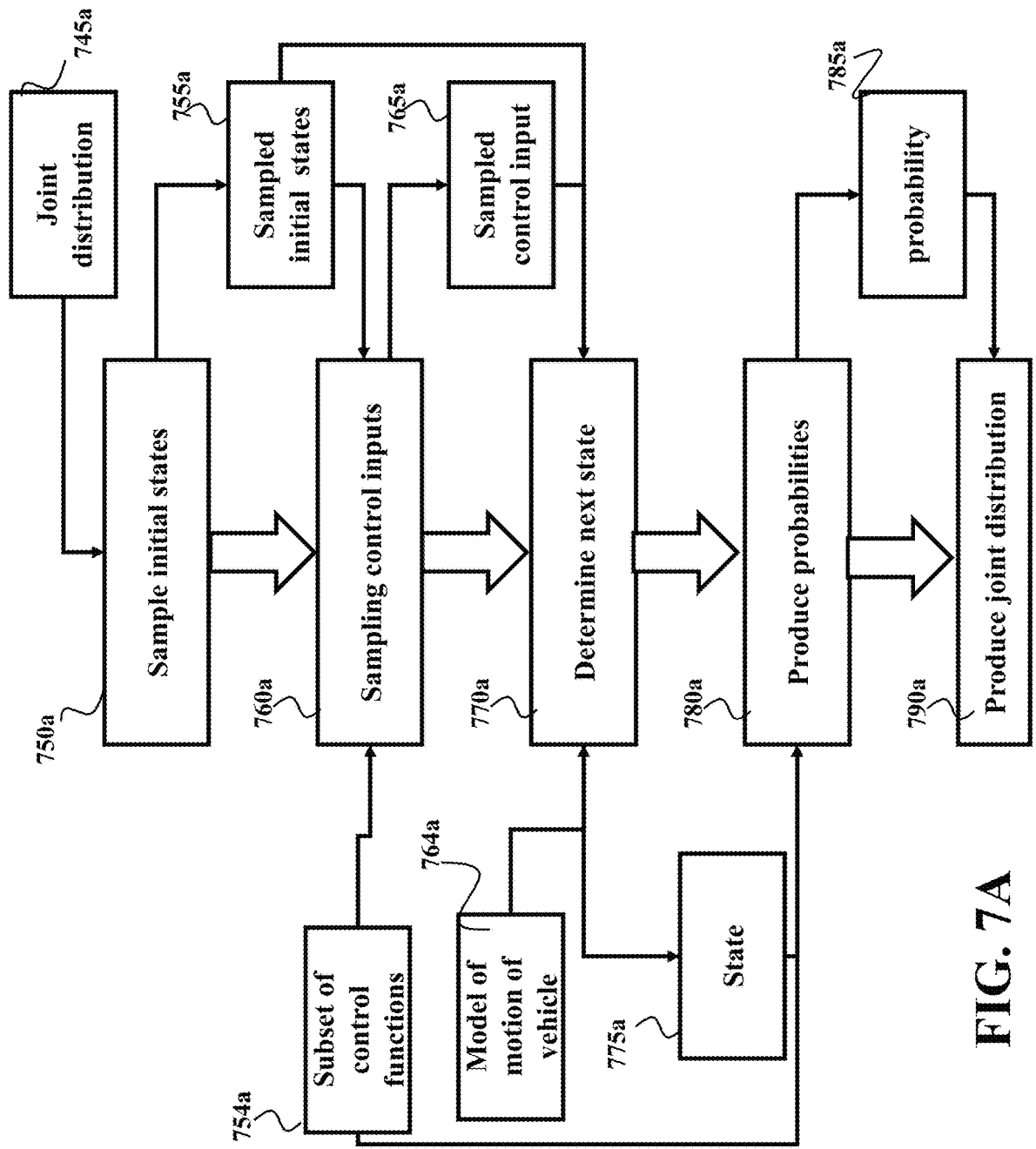
FIG. 7A shows a block diagram of a method for determining a sequence of combined states and probability distributions and controlling a motion of a vehicle according to one embodiment of the invention.

FIG. 7A shows a block diagram of a method for determining iteratively a sequence of combined target states and joint parametric probability distributions over a prediction horizon vehicle according to one embodiment of the invention. The method can be implemented using a processor of the vehicle. Using the joint parametric probability distribution 745a determined during a previous iteration, the method samples 750a initial states representing the joint parametric distribution 745a, to produce a set of sampled initial states 755a. Then, using the subset of control functions 754a, the method samples a feasible space of control inputs to produce a set of sampled control inputs having a nonzero probability to be consistent with the subset of control functions. Using a model 764a of the motion of the vehicle and the sampled control inputs 765a, the method propagates the sampled initial states 755a determines 770a the set of next states 775a for each control input and initial state. Then, the method submits the next set of sampled states 775a in the subset of control functions 754a to produce a set of probabilities for each state 775a indicating the consistence of the next state 775a with the subset of control functions. Finally, an iteration of the method concludes with combining the probabsolities 780a of next target states to produce 790a the joint parametric probability distributions of the next target state.

In some embodiments, the determining the sequence of combined states and probability distributions is implemented as a tree that expands until a sequence of states reaching the driving decision has been found.

Figure 8:
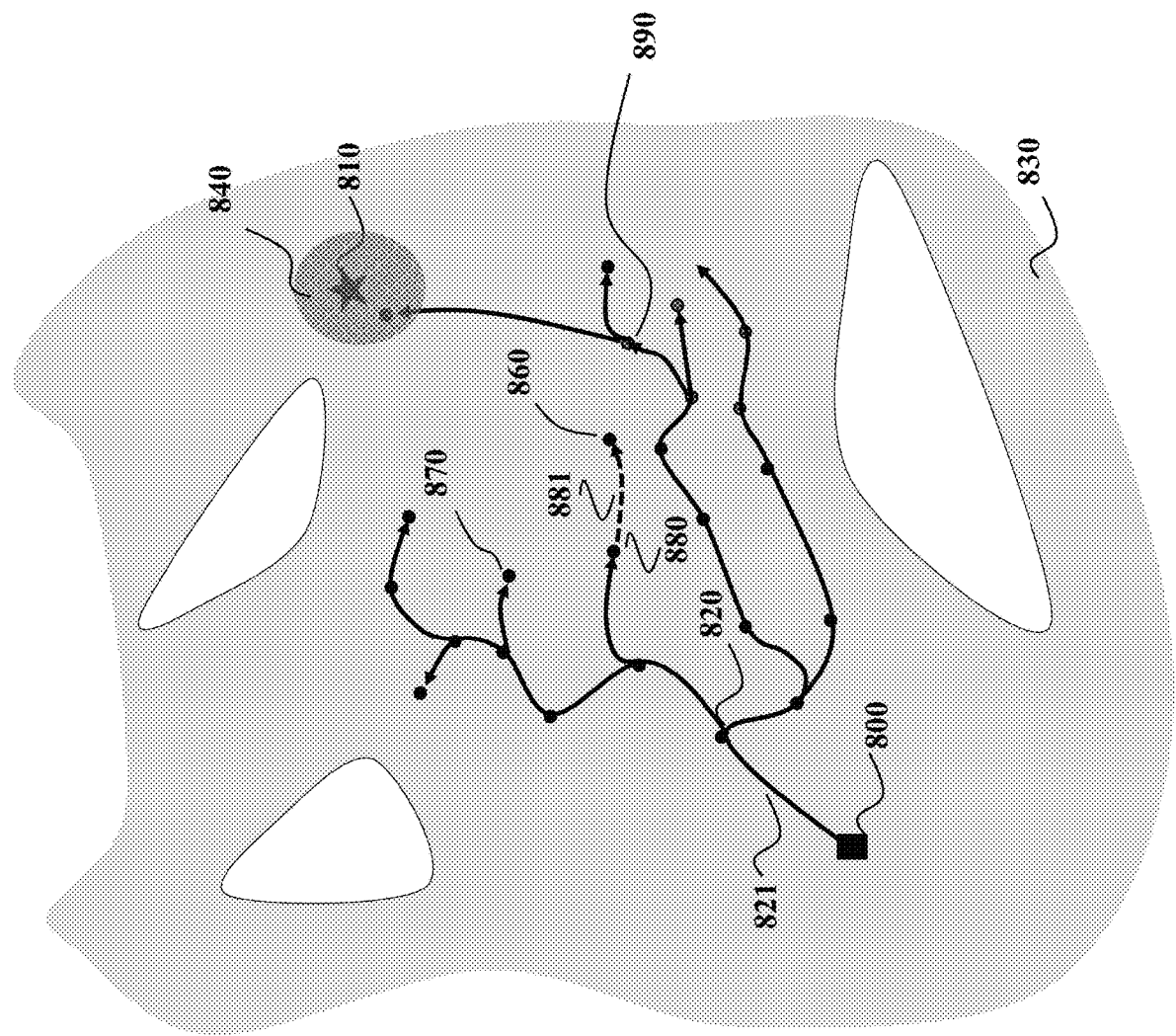
FIG. 8 shows a schematic of a tree of state transitions defining the motion of the vehicle according to some embodiments of the invention.

FIG. 8 shows a schematic of a tree of state transitions defining the motion of the vehicle according to some embodiments of the invention. The current tree in the drivable space 830 is shown with root node 800 indicating the current state of the vehicle and includes the states as nodes and the state transitions as edges in state space, arising from control inputs chosen according to other embodiments of the invention. For example, edge 821 is the motion generated by applying a control input for a predefined time from root node 800 to state 820. The tree can include a target state 810 and target region 840 of the vehicle. In one embodiment of the invention, there can be several target states 810 and regions 840. A probability can be associated to the control input generating edge 821 and therefore also state 820, which accounts for uncertainties in the models of the vehicle, obstacles, and the environment.

In some embodiments, the edges 821 are created by evaluating a control input over several time instants, whereas other embodiments determine a new control input for each time instant, where the determination of control inputs are described according to other embodiments of the inventions. In other embodiments, the edges 821 are created by aggregating several control inputs over one or several time instants. In expanding the tree toward the target region 840, an initial state is selected, a control input is determined, and a corresponding state sequence and final state is determined. For example, 880 can be the selected state, 881 can be the trajectory, which is added as an edge to the tree, and 860 is the final state, added as a node to the tree.

Figure 9A:
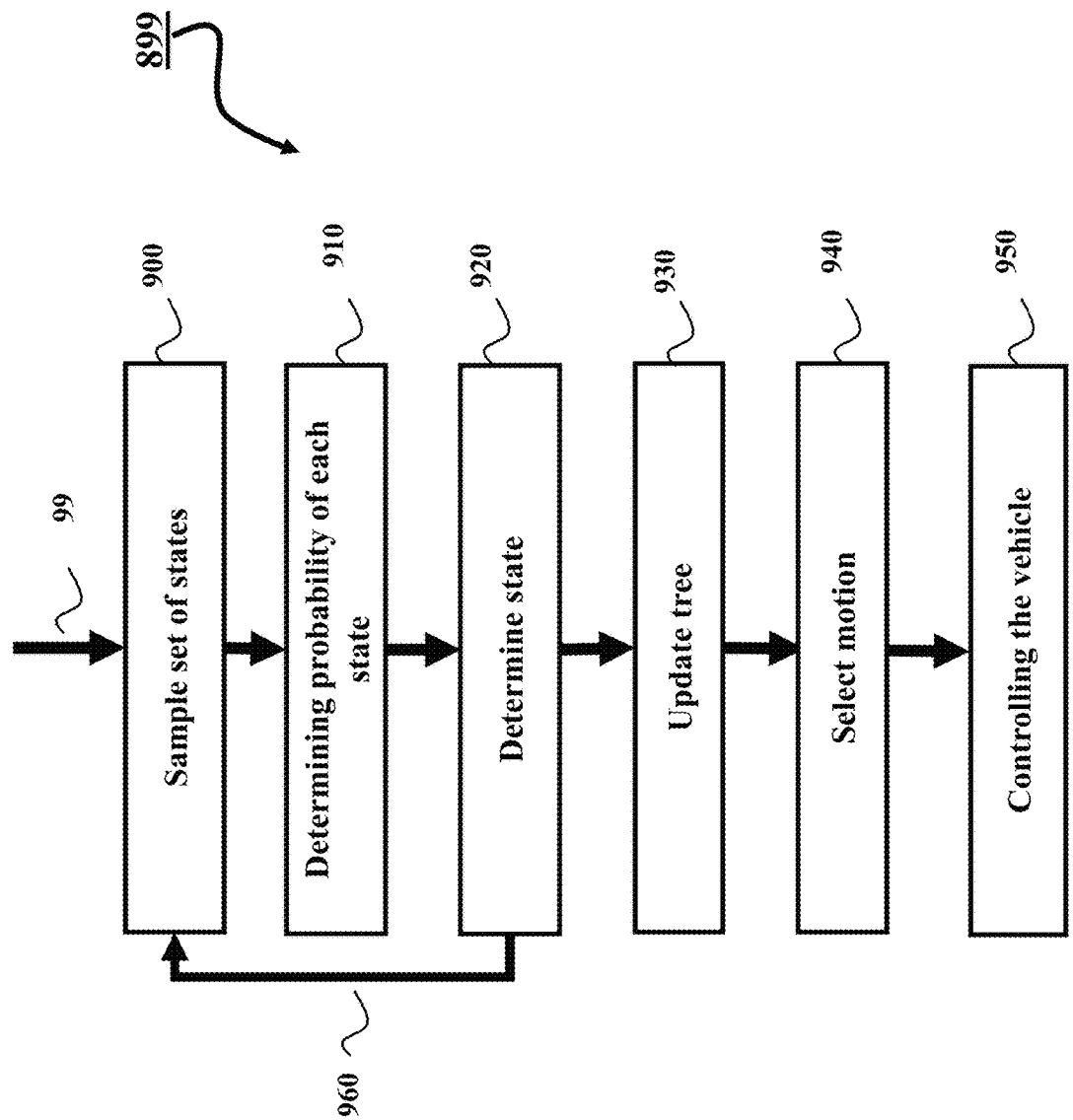
FIG. 9A shows a flowchart of a method for determining the sequence of distributions and controlling the vehicle according to some embodiments of the invention.

FIG. 9A shows a flowchart of a method 899 for determining the sequence of distributions and controlling the vehicle according to some embodiments of the invention. The method determines iteratively a sequence of control inputs specifying the motion of the vehicle from an initial state of the vehicle to a target state of the vehicle. In different embodiments, the initial state is a current state of the vehicle and/or wherein the initial state is the state corresponding to the control input determined during a previous iteration of the method.

The motion is defined by the state transitions connecting states of the vehicle, for example, as shown in FIG. 8. Each state includes a location, a velocity, and a heading of the vehicle. The motion is determined iteratively until a termination condition is met, for example, for a time period or for a predetermined number of iterations. An iteration of the method of FIG. 9A includes the following steps.

The method determines 900 an initial state, a set of sampled states and a corresponding set of state transitions such that the state transition with high probability is consistent with the subset of control functions. For example, the method determines the state 880, the state transition 881, and the state 860 in FIG. 8.

In some embodiments of the invention, the sampled states 900 are generated by using the subset of control functions, i.e., the states are sampled according to the probability density function defining the subset of control functions. For example, a probabilistic function $q(x_{k+1}|x_k, y_{k+1})$ can be used to generate states, where q is a function of the state at time index k+1, given the state at the time index k and the control function at time index k+1.

As a particular example, if the noise on the motion model and the control functions are Gaussian, Gaussian density functions, q can be chosen as $$q(x_{k+1} | x_k^i, y_{k+1}) = p(x_{k+1} | x_k^i, y_{k+1}) = \mathcal{N}\left(x_{k+1} \middle| x_{k+1}^i (\sum)_{k+1}^{-1}\right),$$

$$\text{where } x_{k+1}^i = f(x_k^i) + w_k^i + L_k^i(y_{k+1} - H_k^i f(x_k^i)),$$

$$\sum_{k+1}^i = \left((H_k^i)^T R_{k+1}^{-1}(H_k^i) + Q_k^{-1}\right)^{-1},$$

$$\text{and } L_k^i = \left(Q_k(H_k^i)^T\right)\left(H_k^i Q_k(H_k^i)^T + R_{k+1}^{-1}\right)^{-1},$$

$$H_k^i = \frac{\partial h}{\partial x},$$

that is, the states can be generated as a random sample from a combination of the noise source of the dynamical system and the probabilistic control functions.

In one embodiment of the invention, the generation of the sampled states 900 is executed in a loop, where the number if iterations is determined beforehand. In another embodiment, the generation of states 900 is done based on the specifications T time steps ahead in time. For example, the number of iterations T can be determined as a fixed number of steps, or the iterations can be determined as a function of the resolution of the sensors of the sensing system. When 900 is executed T time steps, the inputs are generated according to all probabilistic control functions from time index k+1 to time index k+T, that is, $q(x_{k+1}|x_k, y_{k+1}, \ldots, y_{k+T})$.

Figure 9B:
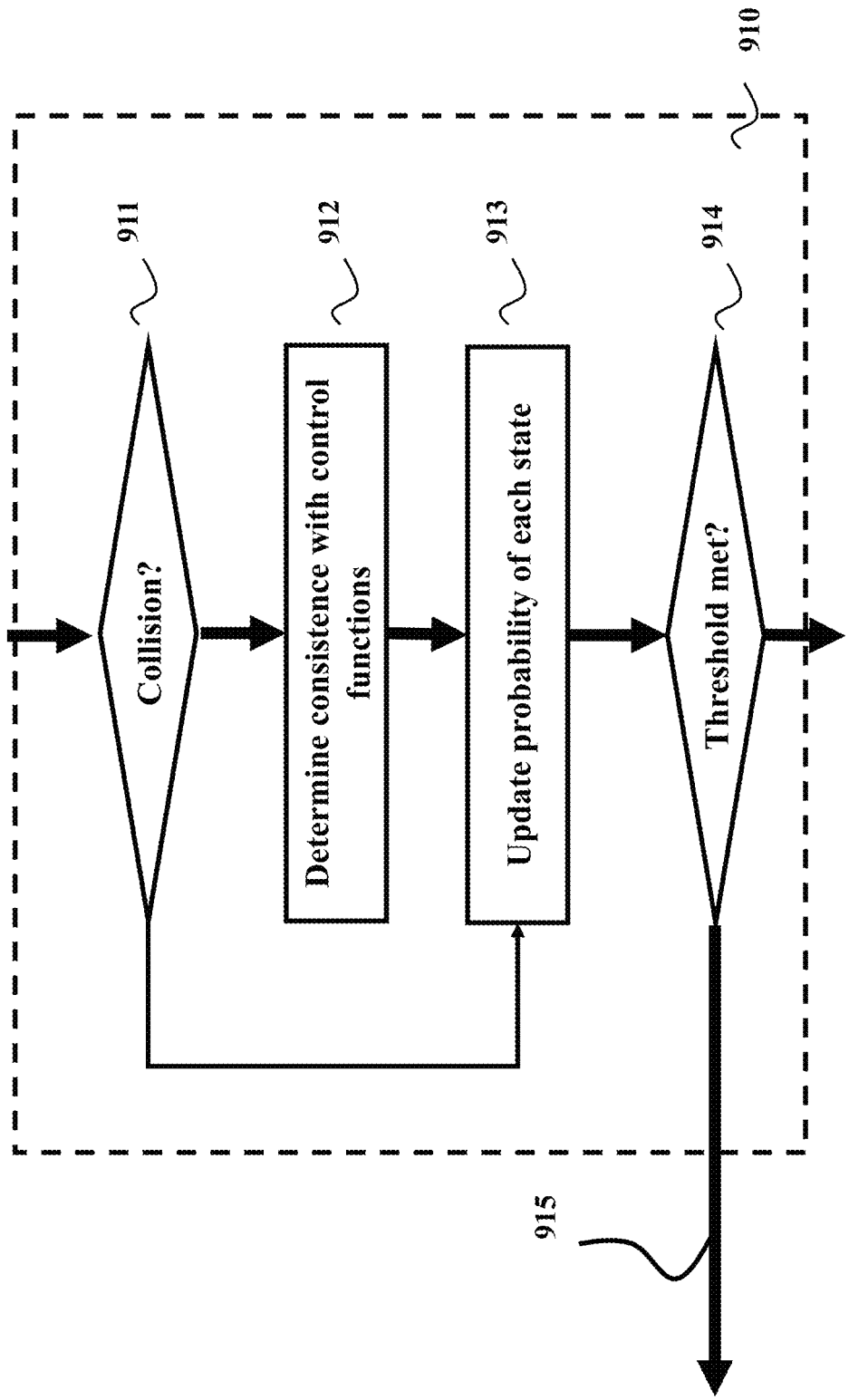
FIG. 9B shows a flowchart of the method that determines the probability of each state being consistent with the probabilistic control functions.

FIG. 9B shows a flowchart of the method 910 that determines the probability of each state being consistent with the probabilistic control functions. When determining the probability of each state, the state is first checked for collision 911. If the next state and the state transition leading up to the state is collision free, consistence of the state with the subset of control functions is determined 912 and the probability of each state is computed 913.

In one embodiment, if the collision check 911 determines that the next state $x_{k+1}^i$ collides with an obstacle, the probability of the state can be set to zero. The collision check can be deterministic, or it can be probabilistic, where a collision can be assumed to happen if the probability of a collision is above some threshold, where the prediction of obstacles is done according to a probabilistic motion model of the obstacle.

Figure 9C:
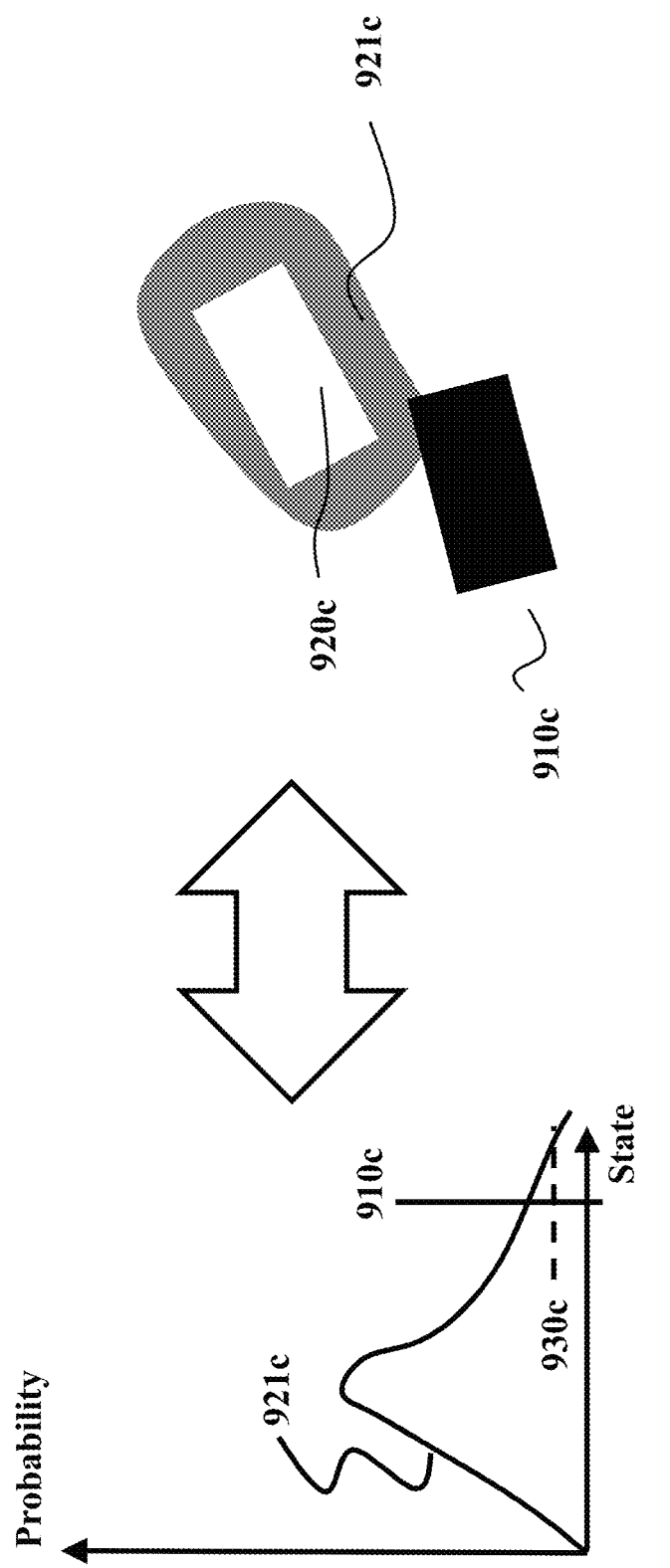
FIG. 9C shows an example where the prediction of the location of the autonomous vehicle intersects with the uncertainty region of the obstacle, and where the probability of the obstacle being at the location is higher than a collision threshold.

FIG. 9C shows an example where the prediction of the location 910c of the autonomous vehicle intersects with the uncertainty region 921c of the obstacle 920c, and where the probability of the obstacle 920c being at the location 910c is higher than a collision threshold 930c. For example, a sensor of the vehicle can determine a position of an obstacle as a function of time. The motion-planning system determines a probability of the next state to intersect with an uncertainty region of the obstacle and assigns a zero probability to the sampled state when the probability of the next state to intersect with the uncertainty region of the obstacle is above a collision threshold.

In another embodiment of the method 910, if the aggregated probability is below a threshold 914, where the threshold can be predetermined, states have a large probability of being consistent with the control functions, so the method exits 915 and restarts 899.

In some embodiments of the invention, the determining 912 is done as a combination of the PDF of the probabilistic control functions, $p(y_{k+1}|x_{k+1}^i)$, the next state, and the probability $\omega_k^i$ of the state determined during the previous cycle 960. For example, if states are generated according to the dynamic model of the vehicle, the probabilities are proportional to the PDF of the control functions, i.e., $\omega_{k+1}^i \propto p(y_{k+1}|x_{k+1}^i)\omega_k^i$. As another example, if the sampling of states is done according to $p(x_{k+1}|x_k^i, y_{k+1})$, as explained above, the probabilities are proportional to the prediction of the PDF of the probabilistic control functions, that is, $\omega_{k+1}^i \propto p(y_{k+1}|x_k^i)\omega_k^i$. In one embodiment, the probabilities are normalized in such a way that they represent a PDF.

In one embodiment of the invention, states with nonzero but low probability are in some time steps replaced with states with higher probabilities. For example, one embodiment generates a new set of states in such a way that the probability of generating $x_k^i$ is $\omega_k^i$. In another embodiment, the replacement is performed whenever the inverse square sum of the probabilities is below some predefined threshold. Doing in such a manner ensures that only probably good states are used.

The determining 920 of the state can be done in several ways. For example, one embodiment determines control input by using a weighted average function to produce the state as $x_{k+1} = \sum_{i=1}^{N} \omega_{k+1}^i x_{k+1}^i$. Another embodiment determines state as the state with highest probability, that is, $i = \text{argmax } \omega_{k+1}^i$. Additionally or alternatively, one embodiment determines the state by averaging over a fixed number m<N of sampled states.

Figure 9D:
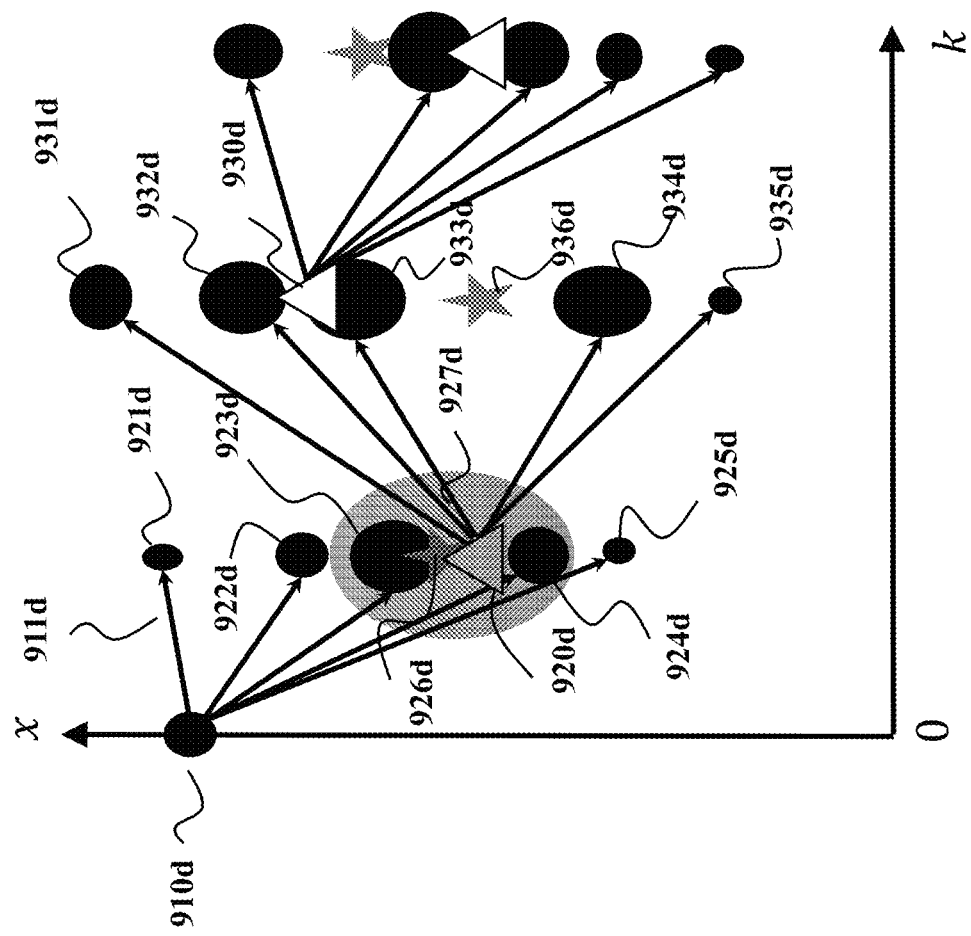
FIG. 9D shows a simplified schematic of the result of three iterations of steps for generating states consistent with probabilistic control functions.

FIG. 9D shows a simplified schematic of the result of three iterations of steps 900, 910 and 920 when five sampled states are generated for each iteration. The initial state 910$d$ is predicted forward in time 911$d$ using the model of the motion and the probabilistic control functions, and five next states are 921$d$, 922$d$, 923$d$, 924$d$, and 925$d$. The probabilities are determined as a function of the probabilistic control functions 926$d$ and the probabilistically allowed deviation 927$d$ of the control functions 926$d$. At each time step, i.e., at each iteration, an aggregate of the probabilities is used to produce an aggregated control input and corresponding state 920$d$.

FIG. 9E shows possible assigned probabilities of the five states at the first iteration in FIG. 9D. Those probabilities 921$e$, 922$e$, 923$e$, 924$e$, and 925$e$ are reflected in selecting the sizes of the dots illustrating the states 921$d$, 922$d$, 923$d$, 924$d$, and 925$d$.

Determining the sequence of probability distributions amounts to determining the distribution of probabilities such as those in FIG. 9E for each time step in the sequence. For instance, the distribution can be expressed as the discrete distribution as in FIG. 9E, or the discrete states associated with probabilities can be made continuous using e.g. a kernel density smoother.

Referring back to FIG. 9D, the state 920$d$ becomes the initial state for the next iteration that again produces five sampled states 931$d$, 932$d$, 933$d$, 934$d$, and 935$d$. The state 930$d$ is selected according to the probabilities of the sampled states of this iteration. The state 930$d$ is the initial state for the next iteration.

Some embodiments update a tree G=(V, E) of nodes and edges as follows. If it is the first iteration of the method 900, the tree is initialized with the current state and the edges are empty. Otherwise, the sequence of aggregated states and sequence of control inputs determined in 900-920 are added as nodes and the trajectories connecting the states are added as edges. For example, 860 in FIG. 8 is an added node and the corresponding edge is 881. Alternatively, in one embodiment all generated states are added to the tree, in which case the determining 920 can be circumvented.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for controlling a motion of a vehicle, comprising:
    an input interface configured to accept a current state of the vehicle, an image of an environment in proximity to the vehicle, and a next driving decision of the vehicle;
    a memory configured to store a set of control functions, wherein each control function is configured to transition the current state of the vehicle into a target state based on its corresponding control objective, wherein at least some of the control functions are probabilistic and include a deterministic component for transitioning the current state into the target state and a probabilistic component for determining a probabilistic distribution of values around the target state determined by the deterministic component, such that an output of the probabilistic control function is a parametric probability distribution over the target state defined by a first moment and at least one higher order moment;
    a processor configured to execute a motion planner and a controller, wherein upon the execution, the motion planner submits the current state into at least a subset of control functions consistent with the next driving decision to produce a subset of parametric probability distributions over the target state; and combines the subset of parametric probability distributions to produce a joint parametric probability distribution of the target state, wherein upon the execution, the controller determines the control command based on the first moment and at least one higher order moment of the joint parametric probability distribution of the target state; and
    an output interface configured to output the control command to an actuator of the vehicle.

2. The system of claim 1, wherein the memory stores multiple probabilistic components for one or multiple control functions, such that different probabilistic components of the control function define different higher order moments of the target state reflected in a shift of the probabilistic distribution around the target state determined by the corresponding deterministic component, and wherein the processor, in response to selection of one of the multiple probabilistic components of the control function, associates the control function with the selected probabilistic component for determining the probabilistic distribution around the target state determined by the deterministic component of the control function.

3. The system of claim 2, wherein different probabilistic components of the control function correspond to different driving styles including at least some of an aggressive driving style, a defensive driving style and a nominal driving style, wherein the system further comprising:
    a selection interface allowing an occupant of the vehicle to select a driving style, wherein the processor associates the control function with a probabilistic component corresponding to the selected driving style.

4. The system of claim 2, wherein the memory further stores multiple deterministic components for the control function, wherein different probabilistic and deterministic components of the control function correspond to different driving styles including at least some of an aggressive driving style, a defensive driving style and a nominal driving style, wherein the system further comprising:
  a selection interface allowing an occupant of the vehicle to select a driving style, wherein the processor associates the control function with the probabilistic component and the deterministic component corresponding to the selected driving style.

5. The system of claim 2, wherein an occupant of the vehicle modifies the driving style by incrementally adjusting a way of driving by informing a selection interface to change the driving style according to the adjustments received from the occupant.

6. The system of claim 1, wherein the processor is configured to select the subset of control functions based on one or a combination of the current state of the vehicle, the image of the environment of the vehicle, and the next driving decision of the vehicle.

7. The system of claim 6, wherein the memory maintains a set of rules mapping different types of the next driving decision to different subsets of control functions applicable for the corresponding type of the next driving decision, and wherein the processor is configured to select the subset of control functions based on a type of the next driving decision of the vehicle, wherein the types of the next driving decision includes one or combination of maintain a direction of motion, avoid an obstacle, change a lane, stop at a traffic light, make a turn.

8. The system of claim 1, wherein the subset of parametric probability distributions includes parametric probability distributions over different state variables of the target state, such that the joint parametric probability distribution of the target state is a multivariable probability distribution.

9. The system of claim 1, wherein the processor transforms the subset of parametric probability distributions into probability distributions over a state variable, such that the joint parametric probability distribution of the target state is a single variable probability distribution over the state variable.

10. The system of claim 1, wherein the set of control functions includes one or combination of
  a stay-on-road function having the control objective to maintain a position of the vehicle within boarders of a road, wherein the stay-on-road function includes the deterministic component that outputs a sequence of target headings of the vehicle based on a current heading of the vehicle and a distance of the vehicle to a boarder of the road, wherein the stay-on-road function includes the probabilistic component providing the probabilistic distribution of values around each target heading in the sequence of the target headings determined by the deterministic component of the stay-on-road function;
  a middle-lane function having the control objective to maintain the position of the vehicle in a middle of a lane, wherein the middle-lane function includes the deterministic component that outputs a sequence of target headings of the vehicle based on a current heading of the vehicle and a lateral displacement of a current position of the vehicle from the middle of the lane, such that tracking of the sequence target headings reduces the lateral displacement, wherein the middle-lane function includes the probabilistic component providing the probabilistic distribution of values around each target heading in the sequence of the target headings determined by the deterministic component of the middle-lane function;
  a maintain-speed function having the control objective to maintain a current speed of the vehicle, wherein the maintain-speed function includes the deterministic component that outputs a target velocity based on a current velocity of the vehicle, such that the target velocity equals the current velocity, wherein the maintain-speed function includes the probabilistic component providing the probabilistic distribution of values around the target velocity determined by the deterministic component of the maintain-speed function;
  a speed-limit function having the control objective to maintain a speed of the vehicle at a speed limit, wherein the speed-limit function includes the deterministic component that outputs a sequence of target velocities of the vehicle reaching the speed limit from the current velocity, wherein the speed-limit function includes the probabilistic component providing the probabilistic distribution of values around each target velocity in the sequence of target velocities determined by the deterministic component of the speed-limit function;
  a safety-margin function having the control objective to maintain a minimum distance between the vehicle and an obstacle on the road, wherein the safety-margin function includes the deterministic component that outputs a sequence of target positions of the vehicle maintaining at least the minimum distance to the position of the obstacle, wherein the safety-margin function includes the probabilistic component providing the distribution of values of the target positions around all instances of the sequence of target positions determined by the deterministic component of the safety-margin function;
  a minimum-headway function having the control objective to maintain a minimum headway between the vehicle and a leading vehicle, wherein the minimum-headway function includes the deterministic component that outputs a sequence of target velocities of the vehicle maintaining the minimum headway, wherein the minimum-headway function includes the probabilistic component providing the distribution of values around each target velocity in the sequence of target velocities determined by the deterministic component of the minimum-headway function;
  a smooth-drive function having the control objective to maintain smoothness of the motion of the vehicle, wherein the smooth-drive function includes the deterministic component that outputs the target velocity of the vehicle based on the current velocity, such that a difference between the target velocity the current velocity is below a threshold, wherein the smooth-drive function includes the probabilistic component providing the distribution of values around the target velocity determined by the deterministic component of the smooth-drive function;
  a change-lane function having the control objective to change a current position of the vehicle from a current lane to a neighboring lane, wherein the change-lane function includes the deterministic component that outputs a sequence of target velocities of the vehicle moving the vehicle to a middle of the neighboring lane, wherein the change-lane function includes the probabilistic component providing the distribution of values of the target positions around all instances of the sequence of target velocities determined by the deterministic component of the change-lane function; and an intersection-crossing function having the control objective to reduce an idle time of the vehicle at an intersection, wherein the intersection-crossing function includes the deterministic component that outputs a sequence of target velocities of the vehicle reducing time of crossing the intersection in consideration of obstacles at the intersection and traffic rules governing the crossing, wherein the intersection-crossing function includes the probabilistic component providing the distribution of values of the target positions around all instances of the sequence of target velocities determined by the deterministic component of the intersection-crossing function.

11. The system of claim 10, wherein the memory stores multiple probabilistic components for one or multiple control functions, such that different probabilistic components of the control function define different higher order moments of the target state reflected in a shift of the probabilistic distribution around the target state determined by the corresponding deterministic component, and wherein the processor, in response to selection of one of the multiple probabilistic components of the control function, associates the control function with the selected probabilistic component for determining the probabilistic distribution around the target state determined by the deterministic component of the control function, wherein the memory stores the multiple probabilistic components for the speed-limit function including an aggressive probabilistic component corresponding to an aggressive driving style and a defensive probabilistic component corresponding to a defensive driving style, wherein a likelihood of sampling the target speed above the speed limit according to the aggressive probabilistic component is greater that the likelihood of sampling the speed above the speed limit according to the defensive probabilistic component;

wherein the memory stores the multiple probabilistic components for the safety-margin function including an aggressive probabilistic component corresponding to the aggressive driving style and a defensive probabilistic component corresponding to the defensive driving style, wherein the value of the target position sampled according to the aggressive probabilistic component is more likely to be closer to the obstacle than the value of the target position sampled according to the defensive probabilistic component;

wherein the memory stores the multiple probabilistic components for the minimum-headway function including a aggressive probabilistic component corresponding to the aggressive driving style and a defensive probabilistic component corresponding to the defensive driving style, wherein the values of the target velocities sampled according to the aggressive probabilistic component is more likely result in the headway smaller than the headway according to the values of the target velocities sampled according to the defensive probabilistic component; and wherein the memory stores the multiple probabilistic components for the change-lane function including an aggressive probabilistic component corresponding to the aggressive driving style and a defensive probabilistic component corresponding to the defensive driving style, wherein the values of the target velocities sampled according to the aggressive probabilistic component is more likely result in a curve sharper than a curve according to the values of the target velocities sampled according to the defensive probabilistic component.

12. The system of claim 1, wherein the controller is a predictive controller configured to determine the control command by optimizing a cost function over a prediction horizon to produce a sequence of control commands to one or multiple actuators of the vehicle, wherein the optimization of the cost function balances a cost of tracking the sequence of the target states defined by the first moments of the joint parametric probability distributions against a cost of at least one other metric of the motion of the vehicle, wherein an importance of the tracking cost is weighted using one or multiple of the higher order moments of the joint probability distribution in the balancing optimization.

13. The system of claim 12, wherein the higher order moments of the probability distributions indicate confidence of the probabilistic motion planner about the motion plan for the vehicle, wherein the adaptive predictive controller increases the weight of the tracking in the balancing optimization with an increase of the confidence allowing lower deviation of the predicted vehicle state values from the sequence of target states and decreases the weight of the tracking in the balancing optimization with a decrease of the confidence allowing larger deviation of the predicted vehicle state values from the sequence of target states.

14. The system of claim 12, wherein the predictive controller is a model predictive controller (MPC) with the cost function formulated as a time-varying stage-wise least squares cost function including the tracking cost weighted with time-varying positive-definite weighting matrices with values that are derived from the higher order moments of the probability distributions.

15. The system of claim 1, wherein the motion planner is a probabilistic and predictive motion planner producing iteratively a sequence of joint parametric probability distributions of the target state over a prediction horizon, wherein for each iteration, the motion planner is configured to sample a feasible space of control inputs to produce a set of sampled control inputs having a nonzero probability to be consistent with the subset of control functions;

propagate the sampled states using a motion model of the vehicle with control inputs consistent with the subset of control functions to produce a next set of sampled states;

submit the next set of sampled states in the subset of control functions to produce a set of probabilistic distributions of next target states; and combine the set of probabilistic distributions of next target states to produce the joint parametric probability distributions of the next target state.

16. A method for controlling a motion of a vehicle, wherein the method uses a processor coupled to a memory storing a set of control functions, wherein each control function is configured to transition the current state of the vehicle into a target state based on its corresponding control objective, wherein at least some of the control functions are probabilistic and include a deterministic component for transitioning the current state into the target state and a probabilistic component for determining a probabilistic distribution of values around the target state determined by the deterministic component, such that an output of the probabilistic control function is a parametric probability distribution over the target state defined by a first moment and at least one higher order moment, wherein the processor is coupled with stored instructions implementing the method, wherein the instructions, when executed by the processor carry out at least some steps of the method, comprising:

accepting a current state of the vehicle, an image of an environment in proximity to the vehicle, and a next driving decision of the vehicle;

submitting the current state into at least a subset of control functions consistent with the next driving decision to produce a subset of parametric probability distributions over the target state;

combining the subset of parametric probability distributions to produce a joint parametric probability distribution of the target state;

determining the control command based on the first moment and at least one higher order moment of the joint parametric probability distribution of the target state; and outputting the control command to an actuator of the vehicle.

17. A non-transitory computer readable storage medium embodied thereon a program executable by a processor for performing a method, the medium stores a set of control functions, wherein each control function is configured to transition the current state of the vehicle into a target state based on its corresponding control objective, wherein at least some of the control functions are probabilistic and include a deterministic component for transitioning the current state into the target state and a probabilistic component for determining a probabilistic distribution of values around the target state determined by the deterministic component, such that an output of the probabilistic control function is a parametric probability distribution over the target state defined by a first moment and at least one higher order moment, the method comprising:

accepting a current state of the vehicle, an image of an environment in proximity to the vehicle, and a next driving decision of the vehicle;

submitting the current state into at least a subset of control functions consistent with the next driving decision to produce a subset of parametric probability distributions over the target state;

combining the subset of parametric probability distributions to produce a joint parametric probability distribution of the target state;

determining the control command based on the first moment and at least one higher order moment of the joint parametric probability distribution of the target state; and outputting the control command to an actuator of the vehicle.

* * * * *